United States Patent
Hosamani et al.

(10) Patent No.: US 11,761,700 B2
(45) Date of Patent: *Sep. 19, 2023

(54) HOUSEHOLD REFRIGERATION APPARATUS HAVING AN ICE MAKER WITH A SPECIFIC SEAL

(71) Applicant: BSH HAUSGERAETE GMBH, Munich (DE)

(72) Inventors: Prashantagouda Hosamani, Ulm (DE); Robert Stahl, Herbrechtingen (DE)

(73) Assignee: BSH Hausgeraete GmbH, Munich (DE)

( * ) Notice: Subject to any disclaimer, the term of this patent is extended or adjusted under 35 U.S.C. 154(b) by 24 days.

This patent is subject to a terminal disclaimer.

(21) Appl. No.: 17/355,300

(22) Filed: Jun. 23, 2021

(65) Prior Publication Data
US 2021/0318059 A1 Oct. 14, 2021

Related U.S. Application Data

(63) Continuation-in-part of application No. 16/695,607, filed on Nov. 26, 2019, which is a continuation-in-part of application No. 16/203,005, filed on Nov. 28, 2018, now Pat. No. 11,415,354, application No. 17/355,300 is a continuation-in-part of application No. 16/203,026, filed on Nov. 28, 2018, now Pat. No. 11,209,201, and a continuation-in-part of application No. 16/203,012,
(Continued)

(51) Int. Cl.
*F25D 23/08* (2006.01)
*F25D 11/00* (2006.01)
*F25D 23/06* (2006.01)
*F25D 23/02* (2006.01)

(52) U.S. Cl.
CPC ............ *F25D 23/087* (2013.01); *F25D 11/00* (2013.01); *F25D 23/028* (2013.01); *F25D 23/069* (2013.01)

(58) Field of Classification Search
CPC .......... F25D 23/087; F25D 11/02; F25C 5/22; F25C 2400/10
See application file for complete search history.

(56) References Cited

U.S. PATENT DOCUMENTS 1,846,203 A * 2/1932 Howard ................ F25D 23/087
49/475.1
2,361,792 A * 10/1944 Philipp ................. F25D 11/025
62/283

(Continued)

*Primary Examiner* — Tavia Sullens
(74) *Attorney, Agent, or Firm* — Laurence A. Greenberg; Werner H. Stemer; Ralph E. Locher

(57) ABSTRACT

A household refrigeration apparatus includes an interior container having a first wall, a second wall, and a rear wall angled to each other. The interior container bounds a first receiving space for food. An ice maker has a housing, and the housing is formed by a wall area of the first wall of the interior container and a wall area of the second wall of the interior container in certain areas. The housing bounds a receiving space of the ice maker. The housing has a wall unit with a wall element being a component separate from the interior container and having an L-shape in cross-section. The wall element has a first wall plate and a second wall plate, which together form the L-shape. An elongated seal with a hollow portion is disposed on an edge of the wall element and seals the wall element to the interior container.

27 Claims, 19 Drawing Sheets

Related U.S. Application Data filed on Nov. 28, 2018, now Pat. No. 11,326,823, and a continuation-in-part of application No. 16/202,993, filed on Nov. 28, 2018.

(56) References Cited

U.S. PATENT DOCUMENTS

| | | | |
|---|---|---|---|
| 2,896,276 A * | 7/1959 | Read | F25D 23/087 |
| | | | 49/498.1 |
| 6,880,355 B2 | 4/2005 | Jung | |
| 2009/0079141 A1* | 3/2009 | Qiang | F16J 15/027 |
| | | | 29/469 |
| 2013/0263620 A1 | 10/2013 | An et al. | |
| 2017/0152623 A1* | 6/2017 | Erickson | D06F 37/269 |
| 2017/0292773 A1* | 10/2017 | Yang | F25D 11/02 |
| 2018/0299189 A1* | 10/2018 | Johnson | F25D 23/087 |
| 2021/0318059 A1* | 10/2021 | Hosamani | F25D 23/028 |

\* cited by examiner

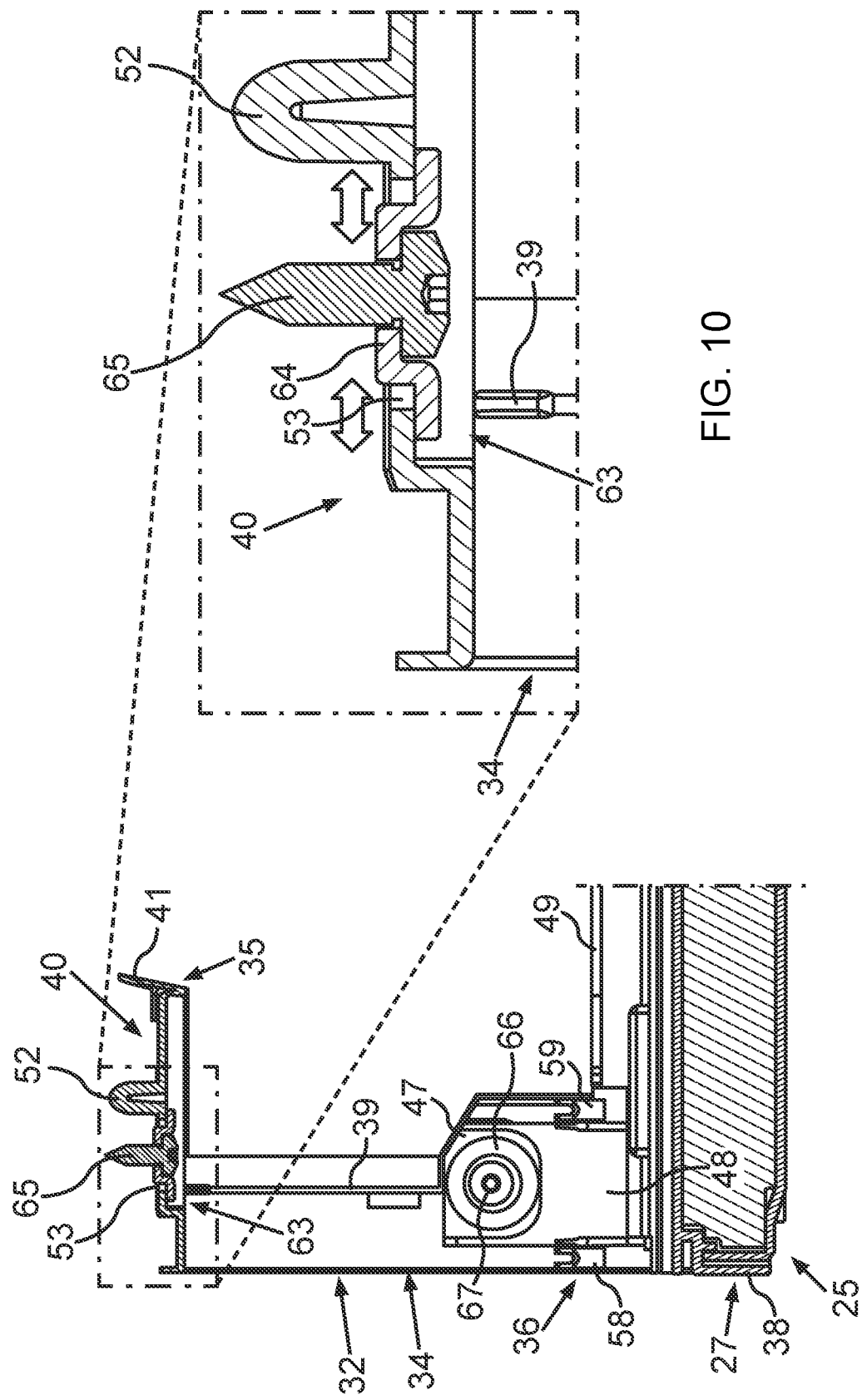

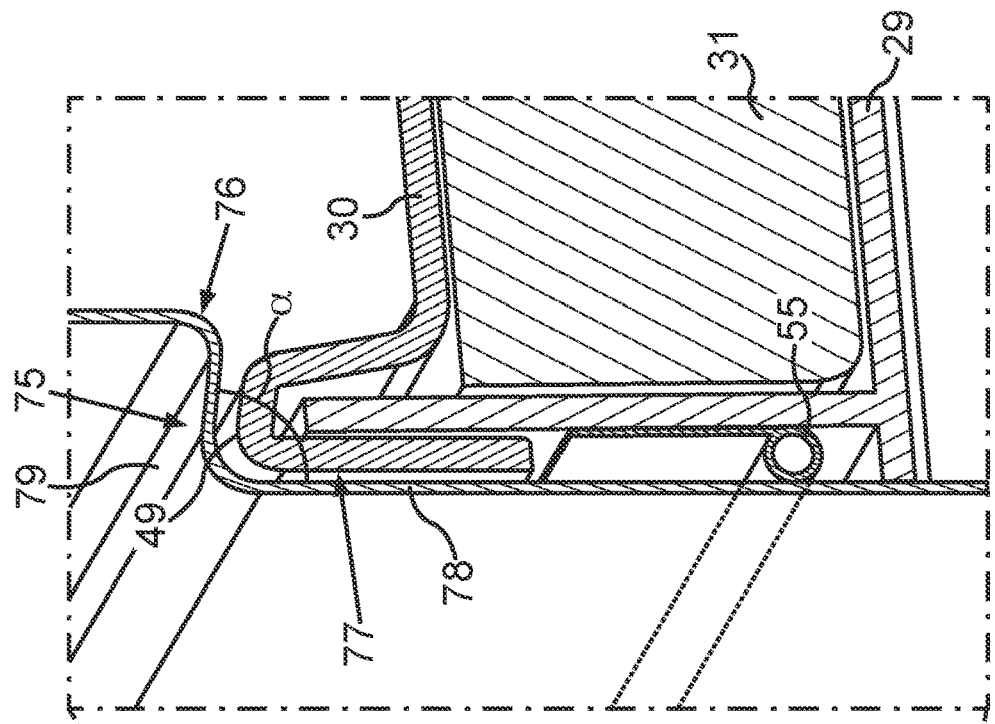
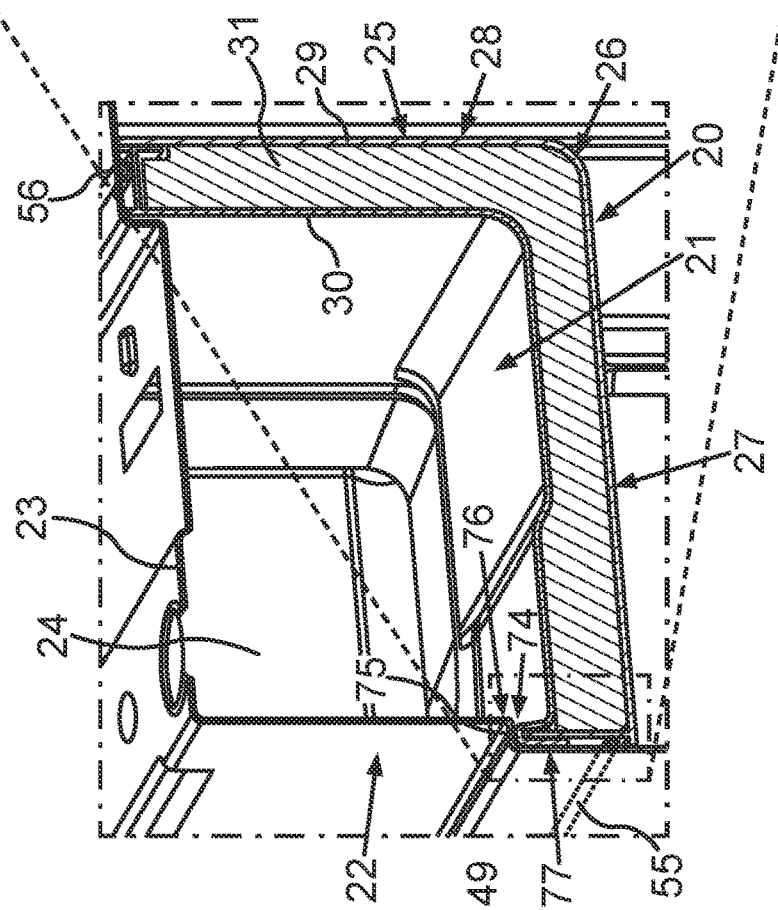
FIG. 16
FIG. 15

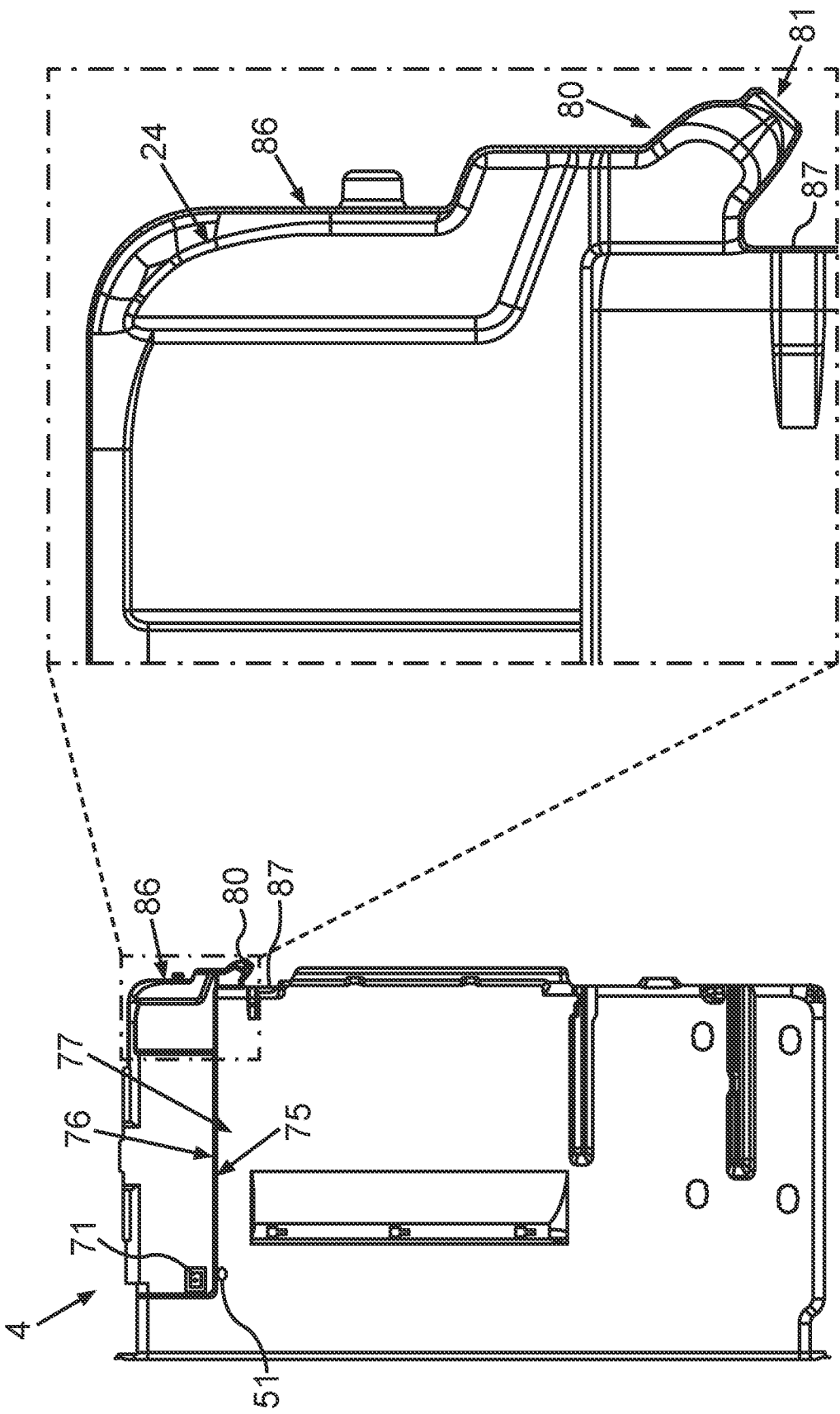

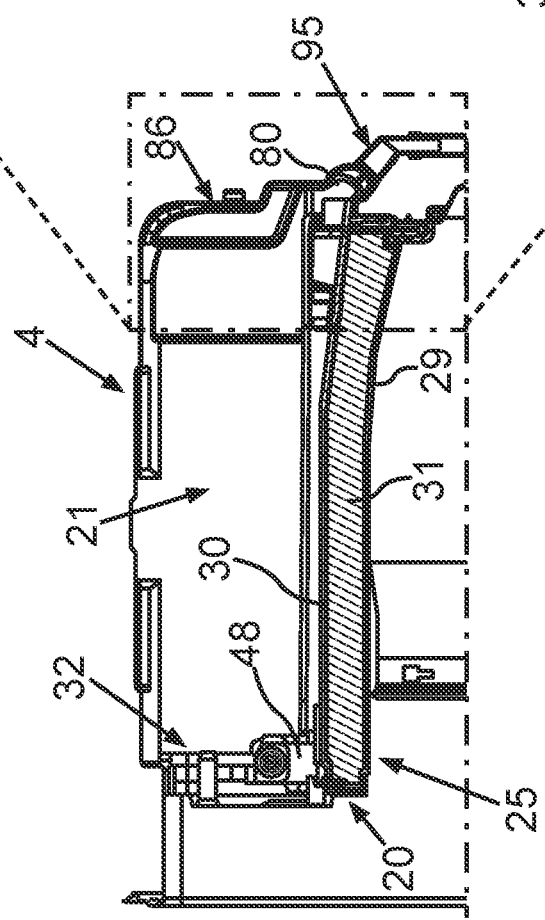
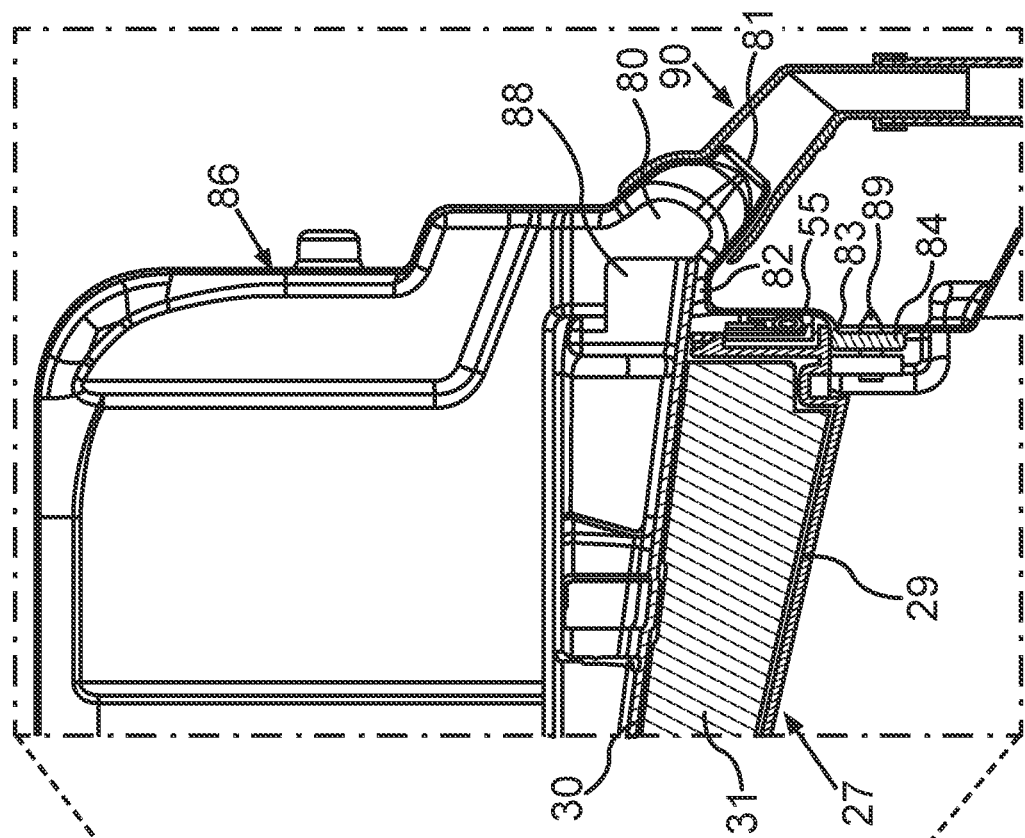
FIG. 21
FIG. 22

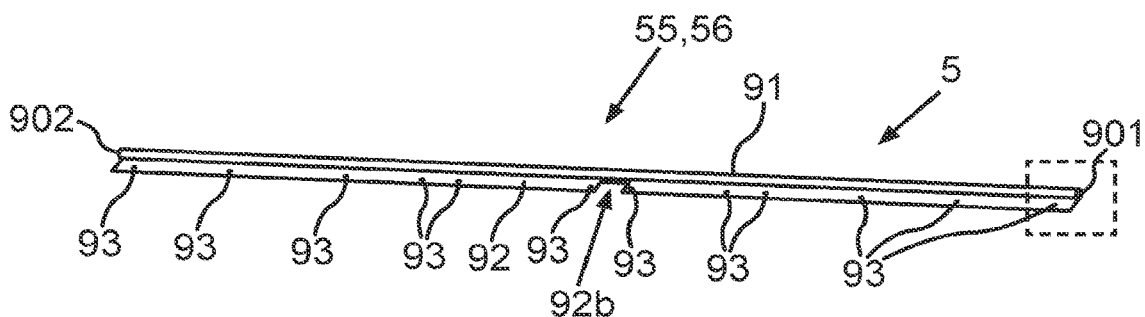
FIG. 26
FIG. 27
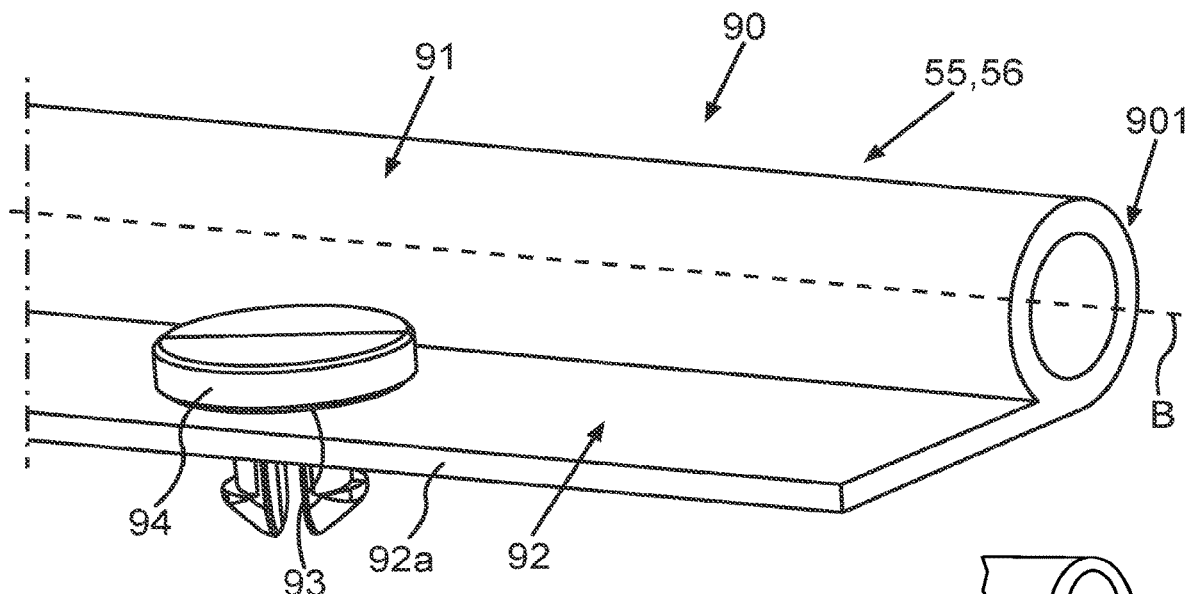
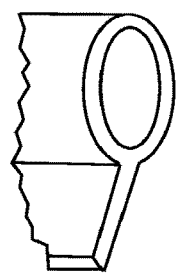
FIG. 27A

HOUSEHOLD REFRIGERATION APPARATUS HAVING AN ICE MAKER WITH A SPECIFIC SEAL

CROSS-REFERENCE TO RELATED APPLICATION

This application is a Continuation-In-Part of U.S. application Ser. No. 16/695,607, filed Nov. 26, 2019, which was a Continuation-In-Part of application Ser. Nos. 16/203,005, 16/203,026, 16/203,012 and 16/202,993, each filed on Nov. 28, 2018; the prior applications are herewith incorporated by reference in their entirety.

BACKGROUND OF THE INVENTION

Field of the Invention

An aspect of the invention relates to a household refrigeration apparatus having an ice maker with a specific seal.

Household refrigeration apparatuses are known in diverse configurations. In this context, it is also known that an interior container bounds a receiving space for a household refrigeration apparatus. This receiving space is usually a refrigerating compartment. A partial area is occupied by an ice maker in this receiving space. Thereto, it is known that the ice maker is separated from the remaining volume of the refrigerating compartment. In this context, it is provided that a housing area of the housing of the ice maker is formed by a separate wall element, which is attached to inner sides of walls of the interior container in the interior of the receiving space of the interior container.

Thus, it is for example known from U.S. Patent Application Publication No. 2013/0263620 A1 to form such an ice maker in the left upper corner area in the refrigerating compartment with front-side view of the household refrigeration apparatus. With the ice maker, ice form elements, for example ice cubes or crushed ice, can be produced from supplied water. These ice form elements can be output via an output unit formed at a door of the household refrigeration apparatus.

In the known design of the household refrigeration apparatus, the separate wall element, which is a constituent of the housing of the ice maker, is attached to walls of the interior container by multiple screw connections. Therein, it is required that this wall element is additionally retained by an assembler himself upon assembly in order to be able to generate the screw connections. This is expensive and can also result in incorrect positions of the wall element. Thereby, the accurate position of the wall element at the interior container cannot be satisfied, whereby impairments in the thermal insulation at the interfaces between the wall elements and the inner side of the walls of the interior container optionally also arise.

A further disadvantage of the known design is to be regarded in that the wall element is formed with a circumferential frame in the front-side area, which is integrally configured. A bracket, which joins to plate elements of the wall element, is formed integrally with these plate elements. Thereby, this integral wall element is very complexly configured in its shape. Therefore, it is also difficult to clean, which optionally results in hygienic impairments of the ice maker.

A further disadvantage of the known household refrigeration apparatus is to be regarded in that condensation water optionally occurring in the housing cannot be transported away. Thereby too, hygienic impairments can occur.

Further an ice maker in a cooling compartment is difficult to be disposed thermally isolated.

BRIEF SUMMARY OF THE INVENTION

It is accordingly an object of the invention to provide a household refrigeration apparatus having an ice maker with a specific seal, which overcomes the hereinafore-mentioned disadvantages of the heretofore-known devices of this general type and in which the ice maker is improved concerning a thermally isolated arrangement.

With the foregoing and other objects in view there is provided, in accordance with the invention, a household refrigeration apparatus, comprising:
  an interior container having a first wall, a second wall, and a rear wall disposed angled to each other, the interior container bounding a first receiving space for food of the household refrigeration apparatus,
  an ice maker having a housing, and the housing formed by a wall area of the first wall of the interior container and a wall area of the second wall of the interior container in certain areas, the housing bounding a receiving space of the ice maker,
  the housing having further a wall unit with a wall element being a component separate from the interior container and having an L-shape in cross-section, the wall element having a first wall plate and a second wall plate, which together form the L-shape, and
  an elongated or elongate seal with a hollow portion disposed on an edge of the wall element and sealing the wall element to the interior container.

With the objects of the invention in view, there is also provided a household refrigeration apparatus, comprising:
  an interior container having a first wall, a second wall, and a rear wall disposed angled to each other, the interior container bounding a first receiving space for food of the household refrigeration apparatus,
  the ice maker having a housing formed by a wall area of the first wall of the interior container, a wall area of the second wall of the interior container, and a wall area of the rear wall of the interior container in certain areas, the housing bounding a receiving space of the ice maker,
  the housing having further a wall unit with a wall element being a component separate from the interior container and having an L-shape in cross-section, the wall element having a first wall plate and a second wall plate, which together form the L-shape, and
  an elongated seal extending along an edge of the wall element and sealing the wall element to the interior container, the elongated seal having a hollow portion which is compressed between the interior container and the wall element in the mounted state of the wall unit.

According to another aspect of the present disclosure, the elongated seal is a one-piece seal.

According to another aspect of the present disclosure, the elongated seal includes a mounting strip.

According to another aspect of the present disclosure, the mounting strip is without hollows.

According to another aspect of the present disclosure, the seal includes a length axis and the hollow portion includes no gap along the length axis.

According to another aspect of the present disclosure, the elongated seal includes a length axis and in a plane perpendicular to the length axis the hollow portion includes a circular cross or oval section.

According to another aspect of the present disclosure, the mounting strip is disposed on the outside of the hollow portion.

According to another aspect of the present disclosure, the mounting strip is overhanging from the outside of the hollow portion.

According to another aspect of the present disclosure, the mounting strip includes a mounting strip gap.

According to another aspect of the present disclosure, the mounting strip includes holes and the ice maker includes separate holders disposed in the holes fixing the seal at the housing.

According to another aspect of the present disclosure, the holders are spring clips.

According to another aspect of the present disclosure, the elongated seal is 3-dimensionally bent and disposed on the housing extending in all three spatial directions.

According to another aspect of the present disclosure, the elongated seal is elastic.

According to another aspect of the present disclosure, the first wall plate includes a side edge and a first rear edge and wherein the seal is disposed on the side edge and the first rear edge and extending along a third edge passage between the side edge and first rear edge.

According to another aspect of the present disclosure, the second wall plate includes an upper edge and a second rear edge and wherein the seal is disposed on the upper edge and the second rear edge and extending along a first edge passage between the upper edge and the second rear edge.

According to another aspect of the present disclosure, a first wall plate includes a first rear edge and the second wall element includes a second rear edge and wherein the elongated seal is disposed on the first rear edge and the second rear edge and extending along a second edge passage between the first rear edge and the second rear edge.

According to another aspect of the present disclosure, the first wall plate and the second wall plate are a one-piece plate.

According to another aspect of the present disclosure, the hollow portion of the elongated seal is compressed between the interior container and the wall element in the mounted state of the wall unit.

According to another aspect of the present disclosure, the interior container having a protrusion which protrudes into the receiving space.

According to another aspect of the present disclosure, the protrusion is integrally formed with the interior container.

According to another aspect of the present disclosure, the protrusion having an elongated shape and extends horizontally along a corner portion between the first side wall and the rear wall.

According to another aspect of the present disclosure, the protrusion having an elongated shape and extends vertically along a corner portion between the second side wall and the rear wall.

According to another aspect of the present disclosure, the elongated seal is compressed between the protrusion and an edge passage of the wall element.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not include all of the features of an originally formulated independent claim. Moreover, implementations and feature combinations are to be considered as disclosed, in particular by the implementations set out above, which extend beyond or deviate from the feature combinations set out in the relations of the claims.

Although the invention is illustrated and described herein as embodied in a household refrigeration apparatus having an ice maker with a specific seal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 9 is a vertical sectional representation of the arrangement in FIG. 4, wherein only a partial area thereof is shown in FIG. 9;

FIG. 10 is an enlarged representation of a partial area of FIG. 9;

FIG. 15 is a vertical sectional representation through the embodiment according to FIG. 14;

FIG. 16 is an enlarged representation of a partial area of FIG. 15;

FIG. 19 is a transparent side view of a further embodiment of an interior container of the household refrigeration apparatus;

FIG. 20 is an enlarged representation of a partial area of the interior container according to FIG. 19;

FIG. 21 is a vertical sectional representation of an upper area of the interior container with a wall unit of a housing of an ice maker of the household refrigeration apparatus disposed thereon;

FIG. 22 is an enlarged representation of a partial area of FIG. 21;

FIG. 26 is a view of the seal shown in FIG. 25 in a state in which it is not bent; and FIG. 27 is a perspective view of an enlarged end part of the seal in FIG. 26 with a round cross section and an added holder and FIG. 27 shows an oval cross section of the tube.

DETAILED DESCRIPTION OF THE INVENTION

With indications of "top," "bottom," "front," "rear," "horizontal," "vertical," "depth direction," "width direction," "height direction," etc., the positions and orientations given in intended use and intended arrangement of the apparatus are specified.

Figure 1:
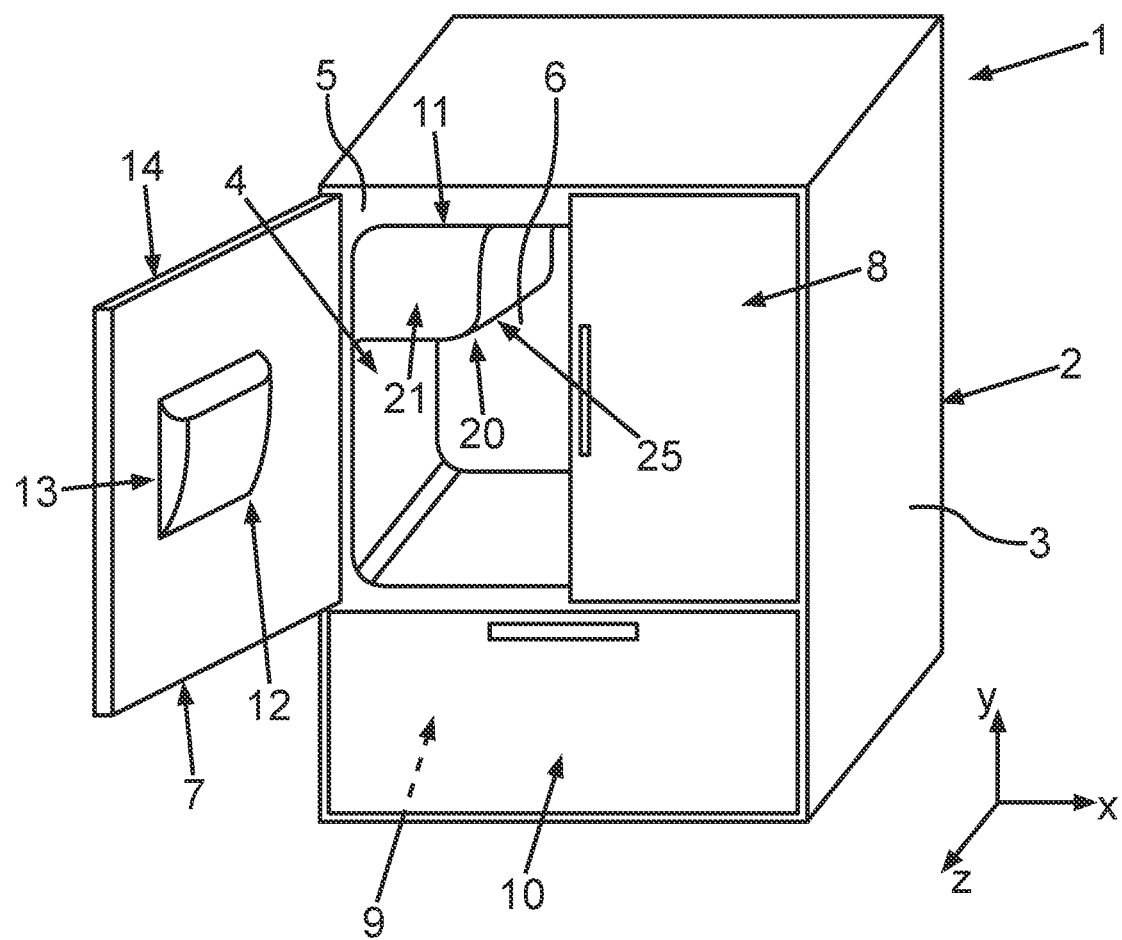
FIG. 1 is a simplified perspective representation of an embodiment of a household refrigeration apparatus according to the invention.

Referring now in detail to the figures of the drawings, in which identical or functionally identical elements are provided with the same reference characters, and first, particularly, to FIG. 1 thereof, there is seen a household refrigeration apparatus 1 shown in a simplified representation, which is provided for storing and preserving food. The household refrigeration apparatus 1 includes a housing 2. The housing 2 includes an exterior housing 3. Moreover, the household refrigeration apparatus 1 includes an interior container 4 separate from the exterior housing 3. The interior container 4 is received in the exterior housing 3. A thermally insulating material such as for example insulating foam and/or a vacuum insulating panel is disposed in a clearance 5 between the exterior housing 3 and the interior container 4. The interior container 4 is an inner liner.

In the embodiment, the interior container 4 bounds a receiving space 6 with its walls, which is formed for receiving food. Here, the receiving space 6 is in particular formed as a refrigerating compartment.

On the front side, the interior container 4 includes a loading opening, via which food can be taken into or be removed from the receiving space 6. In the embodiment, the receiving space 6 is closable by two separate doors 7 and 8.

The two doors 7 and 8 are pivotably disposed at the housing 2. The two doors 7 and 8 are disposed in the same height position viewed in height direction (y-direction) of the household refrigeration apparatus 1. In width direction (x-direction) of the household refrigeration apparatus 1, they are disposed next to each other such that they collectively close the receiving space 6 on the front side in the closed state. In particular, these two doors 7 and 8 are disposed in a common plane in the closed state, which is spanned by the height direction and the width direction.

In FIG. 1, the door 7 on the left side with front-side view is illustrated opened and the door 8 on the right side is illustrated closed.

The household refrigeration apparatus 1 includes at least one further receiving space 9 for food. This further receiving space 9 is separated from the first receiving space 6. The further receiving space 9 can for example be a freezing compartment or a keep-fresh compartment or a further refrigerating compartment. Viewed in height direction, this further receiving space 9 is formed below the first receiving space 6. The further receiving space 9 is in particular bounded by further walls of an interior container, which can also be the interior container 4. Preferably, it is provided that the further receiving space 9 is bounded by a further door 10, which is shown in the closed state in FIG. 1. Preferably, it is provided that this door 10 is formed as a front plate of a drawer linearly retractable and extendable in depth direction (z-direction) of the household refrigeration apparatus 1.

It can be provided that the household refrigeration apparatus 1 includes multiple, separate further receiving spaces 9, and further such explained drawers are preferably formed in this context. They can adjoin to the further receiving space 9 towards the bottom viewed in height direction. They are in particular also formed within the housing 2.

Further, the door 10, in particular this front plate, is disposed in the same plane as the doors 7 and 8 in the closed state of the doors 7, 8 and 10. In particular, the doors 7, 8 and 10 are front-side vision components of the household refrigeration apparatus 1. In particular, they are also, if they are closed, disposed without overlap with each other.

Moreover, the household refrigeration apparatus 1 includes an ice maker 11. The ice maker 11 occupies a partial area of the volume of the receiving space 6 and is thermally insulated from the remaining volume of the receiving space 6. The ice maker 11 is formed to produce ice from water, which is supplied to the household refrigeration apparatus 1 via an external water supply line. In this context, ice form elements such as ice cubes or crushed ice can be produced.

Further, the ice maker 11 is a constituent of the dispenser unit 12 of the household refrigeration apparatus 1. In this advantageous implementation, the dispenser unit 12 includes an output unit 13 in addition to the ice maker 11. This output unit 13 can preferably be formed at a door 7, 8. In the shown embodiment, the output unit 13 is disposed at the door 7. This is in particular advantageous because the ice maker 11 is disposed in the left upper corner area of the total volume of the receiving space 6 with front-side view of the household refrigeration apparatus 1. For outputting produced ice form elements, short paths are achieved by this local positioning. The output unit 13 is fixedly installed at the door 7. Moreover, the output unit 13 is separated from the ice maker 11 and also decoupled from it in this context. In the closed state of the door 7, ice form elements produced by the ice maker 11 can get into the output unit 13 and be output via a front side 14 of the door 7. Thereto, it is provided that a recess is formed on the front side 14, which faces away from the receiving space 6 in the closed state of the door 7. A vessel can be placed in this recess to be able to collect the output ice form elements.

In particular, the dispenser unit 12 can also be formed for outputting liquid such as water or other drinks in addition to the output of ice form elements.

Figure 2:
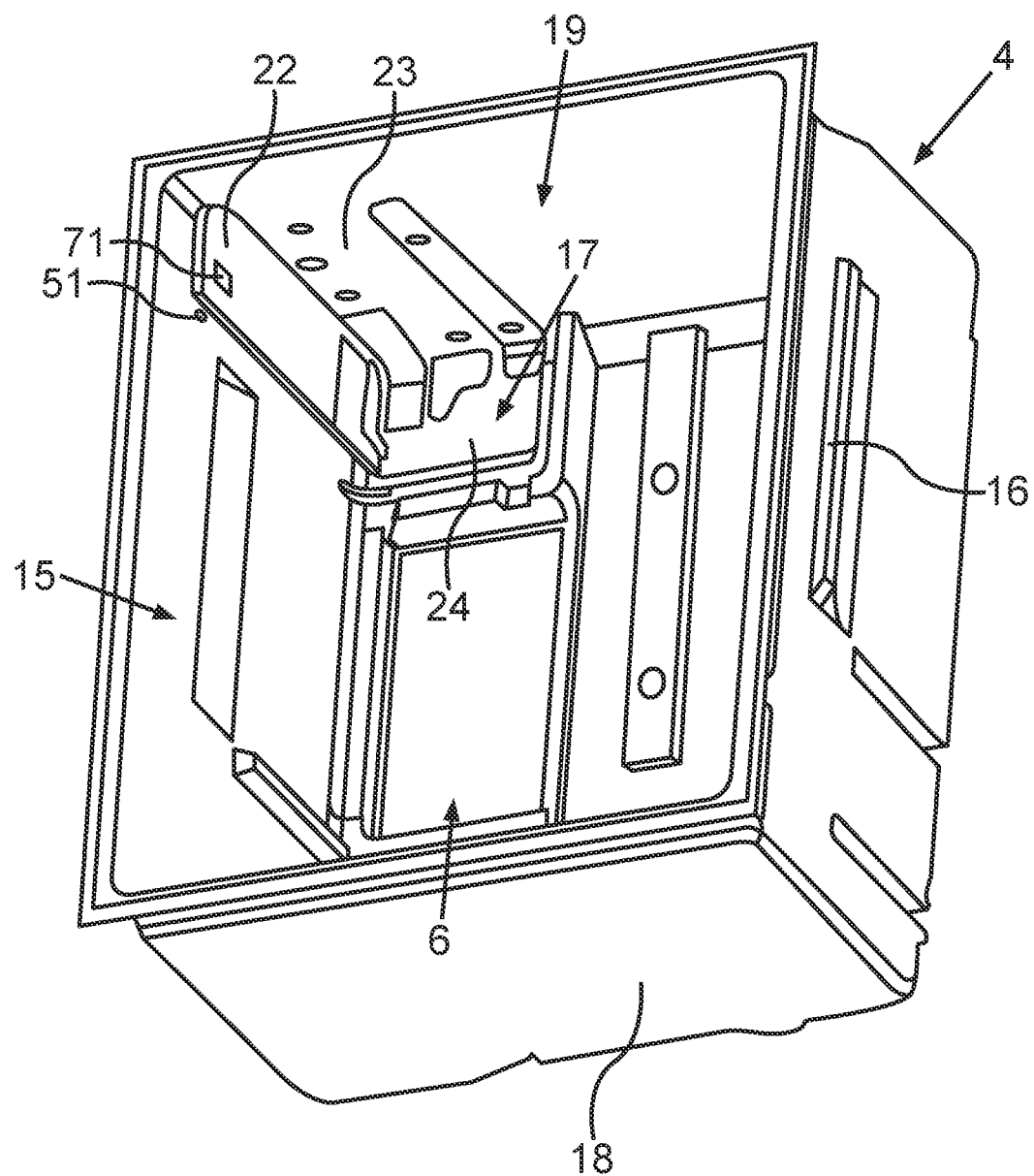
FIG. 2 is a perspective representation of an embodiment of an interior container of the household refrigeration apparatus.

In FIG. 2, an embodiment of the interior container 4 is shown in a perspective representation. The interior container 4 is preferably integrally produced from plastic, for example by deep-drawing. Injection molding can also be provided.

The interior container 4 includes multiple walls, which bound the receiving space 6. For example, the interior container 4 is formed with a first vertical side wall, which is a first wall 15 in the example, an opposing second vertical side wall 16, a rear wall 17, which is a third wall in the example, a bottom wall 18 and a ceiling wall, which is a second wall 19 in the example.

The first vertical side wall for example represents a first wall 15 of the interior container 4. In an embodiment, the ceiling wall represents a second wall 19 of the interior container 4, which is disposed angled, in particular at an angle of 90°, to the first wall 15.

The ice maker 11 includes a housing 20 (FIG. 1). A receiving space 21 of this ice maker 11 is bounded by the housing 20. The housing 20 includes a wall area 22 (FIG. 2) of the first wall 15 as a constituent. This wall area 22 is an upper wall area in the configuration according to FIG. 1 and FIG. 2. Moreover, a further constituent of the housing 20 of the ice maker 11 is formed by a wall area 23 of the second wall 19.

Moreover, the receiving space 21 is bounded by a further wall area 24. This further wall area 24 is an integral constituent of the rear wall 17 of the interior container 4. The wall areas 22, 23 and 24 directly join to each other.

Moreover, the housing 20 includes a wall unit 25 (FIG. 1), which is a component separate from the interior container 4. This wall unit 25 is a further constituent of the housing 20 and bounds the receiving space 21 of the housing 20 in addition to the wall areas 22, 23 and 24.

Figure 3:
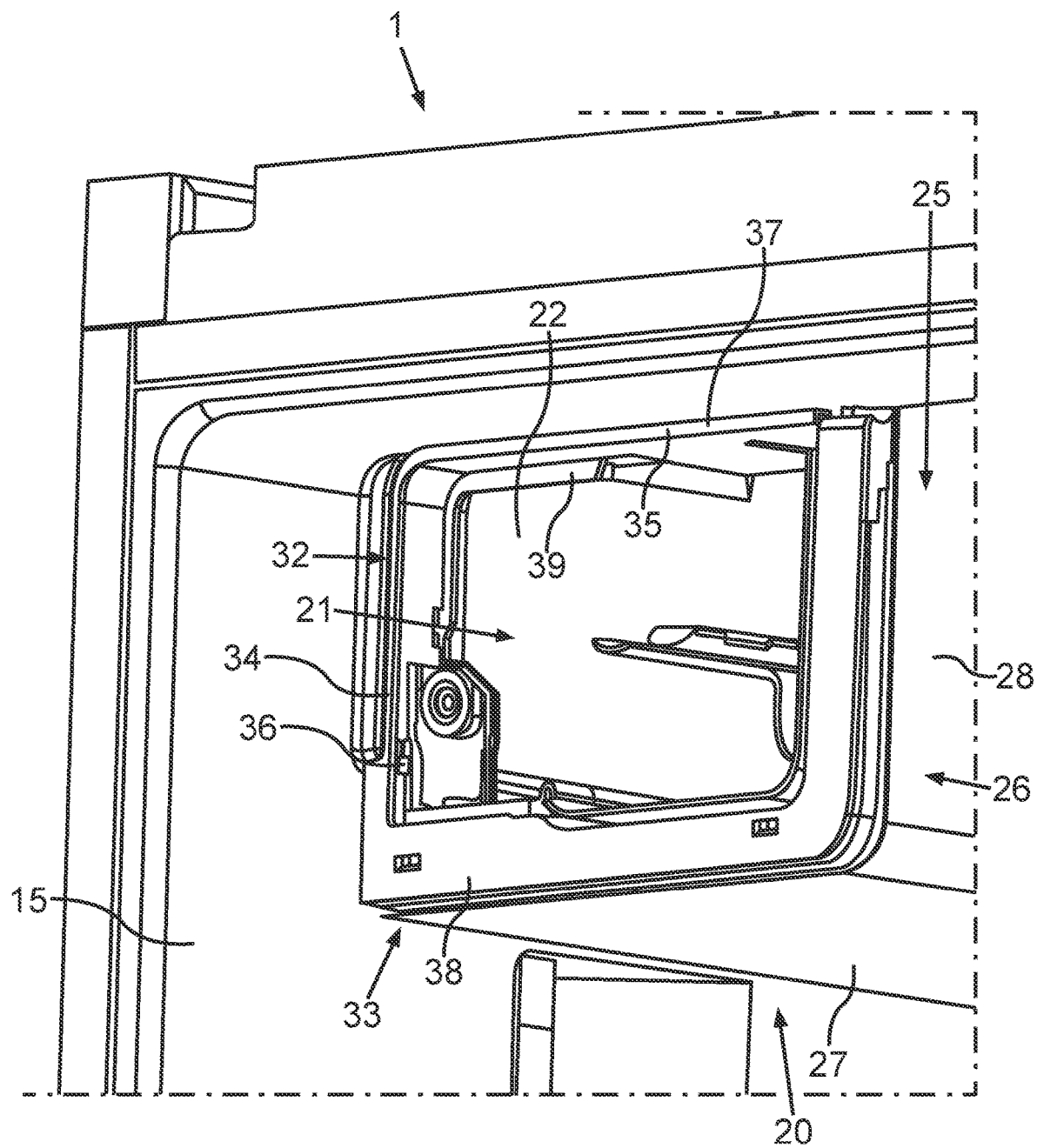
FIG. 3 is an enlarged partial representation of the household refrigeration apparatus according to FIG. 1.

In FIG. 3, a perspective representation of a partial area of the household refrigeration apparatus 1 is shown. Here, the housing 20 of the ice maker 11 is in particular shown. The wall unit 25 is shown, which is here already represented in the assembled state at the interior container 4, in particular in the receiving space 6.

In the shown embodiment, the wall unit 25 includes a wall element 26. The wall element 26 is formed with an L-shape in a vertical section (sectional plane spanned by the height direction and the width direction). Thereto, the wall element 26 includes a first wall plate 27. Here, the first wall plate 27 is oriented in horizontal direction. Moreover, the wall element 26 includes a vertical wall plate. This vertical wall plate is a second wall plate 28 of the wall element 26. The wall plates 27 and 28 are in particular oriented at an angle of 90° to each other. They extend in depth direction of the household refrigeration apparatus 1 in their plate shape or in their area shape.

Figure 6:
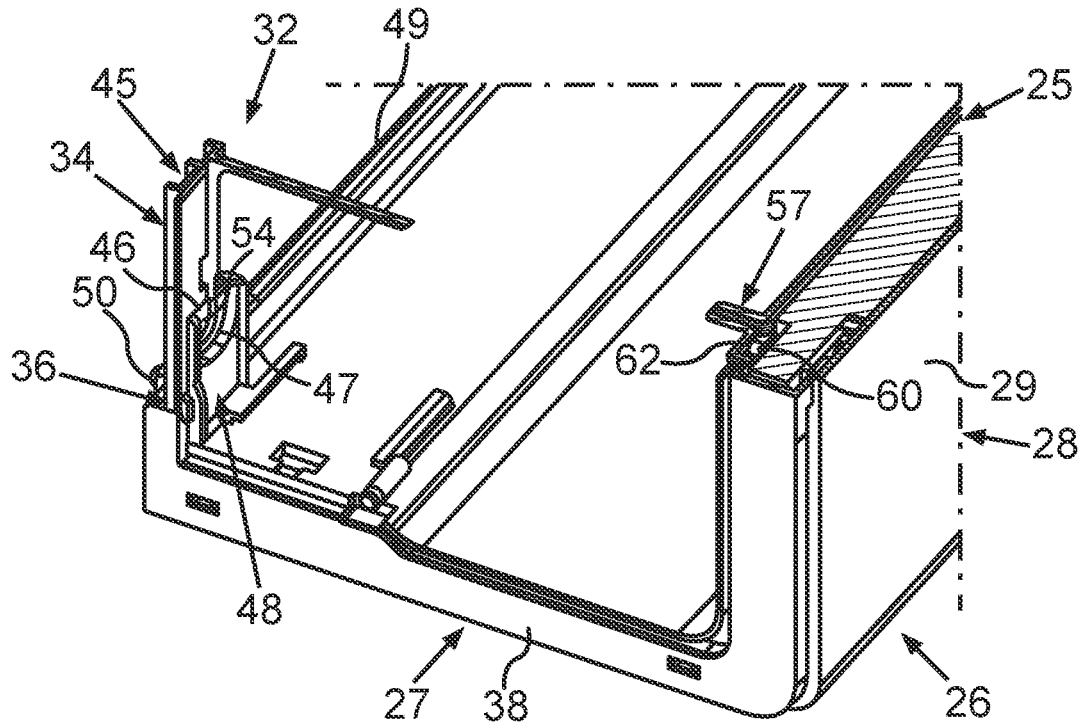
FIG. 6 is a representation according to FIG. 5, in which a partial area is additionally shown in a horizontal sectional representation.

The wall element 26 is formed as a thermal insulating body. This means that the wall element is formed of an outer wall element 29 (FIG. 6) and an inner wall element 30 (FIG. 6). A thermally insulating material 31 (FIG. 6) is formed in a clearance between the outer wall element 29 and the inner wall element 30.

Moreover, the wall unit 25 includes a positioning bracket 32 (FIG. 3). The positioning bracket 32 is in particular integrally formed, for example of plastic. Preferably, the positioning bracket 32 is non-rectilinearly formed. The positioning bracket 32 is preferably formed as an angular part, in particular with an L-shape.

In the embodiment in FIG. 3, it is provided that the positioning bracket 32 is a component separate from the wall element 26, but is connected to the wall element 26. Here a non-destructively detachable connection is in particular provided. By such a configuration, simpler production of the individual components of the wall unit 25 is allowed on the one hand. Thereby, the disassembly is reversibly allowed on the other hand and the individual parts can for example be individually better cleaned.

As is apparent in FIG. 3, the positioning bracket 32 is disposed on a front area 33 viewed in depth direction of the housing 20, which is also the depth direction of the household refrigeration apparatus 1. In particular, the positioning bracket 32 is disposed at the front end of the housing 20. The positioning bracket 32 includes a first bracket leg 34, which is here a vertical bracket leg. Moreover, the positioning bracket 32 includes a horizontal bracket leg 35, which is here a second bracket leg. As is apparent in FIG. 3, the first bracket leg 34 joins to the wall element 26 with its free end, in particular to the first wall plate 27. There, it is non-destructively detachably fixed.

The second bracket leg 35 joins to the second wall plate 28 with its free end and is there in particular non-destructively detachably fixed.

In this context, the positioning bracket 32 includes a first end 36, which is non-destructively detachably connected to the first wall plate 27. The positioning bracket 32 includes a second end 37, which is non-destructively detachably connected to the second wall plate 28.

Further, the wall element 26 includes a front edge 38. This front edge 38 can be formed by a front flange. In this context, the front flange represents a front-side end part. The front edge 38 can be formed integrally with the interior part 30.

A circumferentially closed frame is formed by the front edge 38 and the positioning bracket 32. Thereby, a front-side opening of the housing 20 is also bounded.

Further, the positioning bracket 32 includes at least one stiffening rib 39. This first stiffening rib 39 is formed on an inner side of the positioning bracket 32. Preferably, it is formed angled, in particular L-shaped.

A stiffening of the wall element 27 in particular in the front area 33 is also allowed by the positioning bracket 32. In particular, an additional separate assembly part is also provided by the positioning bracket 32, by which the wall unit 25 can be disposed at the interior container 4 in improved manner.

Figure 4:
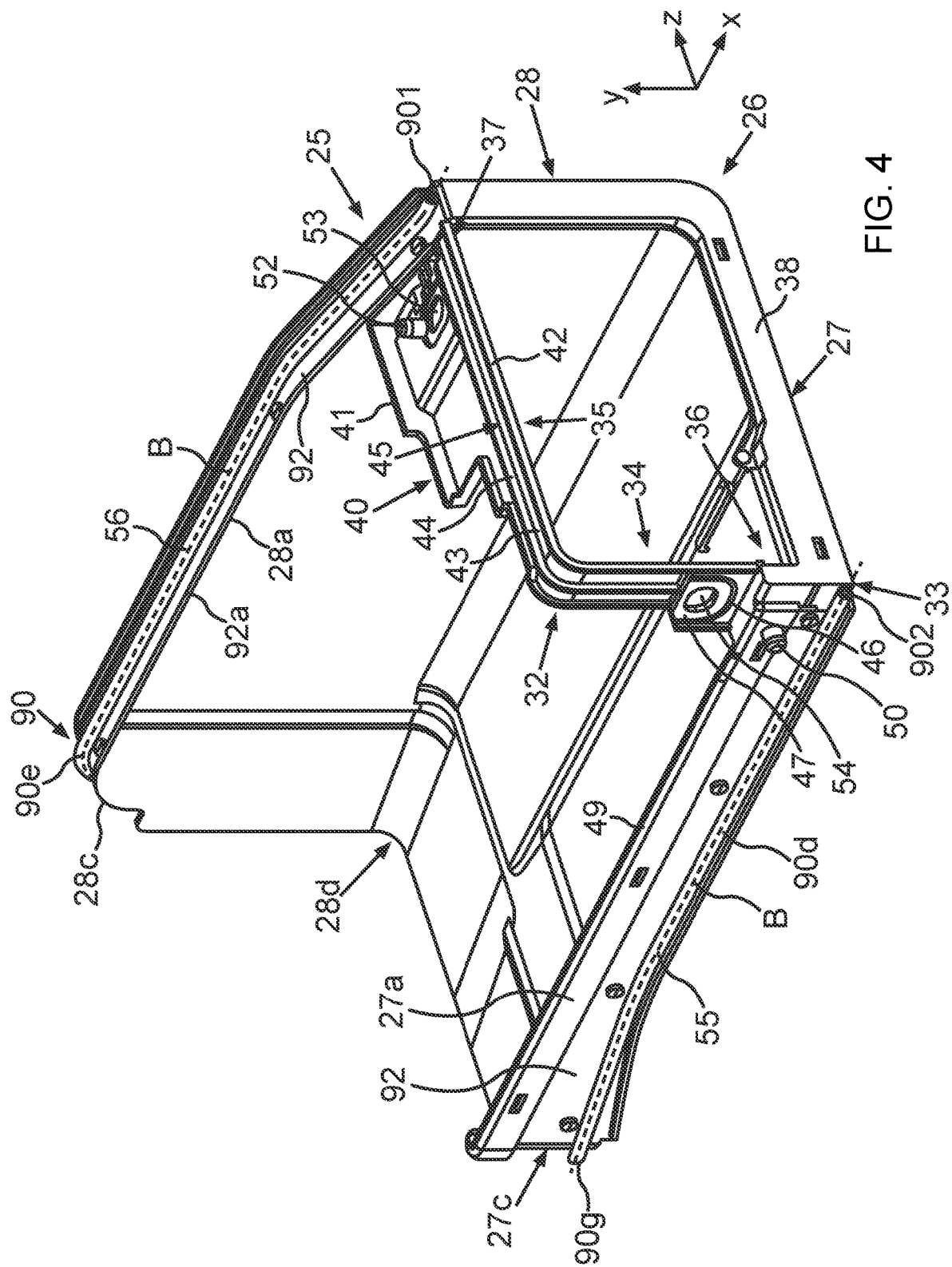
FIG. 4 is a perspective view of an enlarged representation of a partial area of a housing of an ice maker of the household refrigeration apparatus with a disposed seal.

In FIG. 4, an embodiment of the wall unit 25 is shown in a perspective representation.

In this example, the positioning bracket 32 includes a plate area 40 at the second bracket leg 34. The plate area 40 extends across the length of the second bracket leg 35 in certain areas, wherein this is viewed in width direction of the household refrigeration apparatus 1. The plate area 40 is bounded by a bounding wall 41 such that a trough area arises here. Here, the bounding wall 41 is in particular also formed for reinforcement or stiffening. The bounding wall 41 is formed uninterrupted continuously up to the end 36 of the first bracket leg 34.

Moreover, it is also provided in FIG. 4 that a further stiffening rib 42 is formed at the front-side edge of the positioning bracket 32. This stiffening rib 42 too, which extends outwards from an outer side 43 of the positioning bracket 32 in raised manner, is formed uninterrupted. This further stiffening rib 42 extends from the second end 37 of the positioning bracket 32 up to the first end 36. The stiffening rib 42 is extending in the direction of a longitudinal axis oriented along the angled shape of the positioning bracket 32.

Moreover, the positioning bracket 32 includes a further stiffening rib 44. This stiffening rib 44 is formed offset rearward to the stiffening rib 42 viewed in depth direction and in particular oriented parallel to it. It is also formed uninterrupted. A receiving groove 45 is formed between these two stiffening ribs 42 and 44, which is formed for receiving a seal.

As is moreover apparent in FIG. 4, the first bracket leg 34 includes a hole or an aperture 46. An engagement area 47 of a coupling flap 48 (FIG. 5) engages with this aperture 46. The coupling flap 48 is formed integrally with the first wall plate 27. In particular, this coupling flap 48 is formed integrally with the interior cladding or the integrally formed inner wall element 30 of the wall element 26. By this configuration, locking between the positioning bracket 32 and the wall element 26 is also formed. Thus, a locking device between the wall element 26 and the positioning bracket 32 is formed at this first end 36 of the positioning bracket 32. In particular, the coupling flap 48 is formed elastically resilient such that the coupling flap 48 is slightly deformed upon attaching the positioning bracket 32 and then the engagement area 47 snaps or locks in the aperture 46.

As is moreover apparent in FIG. 4, the wall plate 27 includes a web 49 at the end facing away from the second wall plate 28. This web 49 advantageously extends uninterrupted across the entire length of the first wall plate 27, wherein this is viewed in depth direction.

As is apparent in FIG. 4, in which the positioning bracket 32 is shown in its assembled final state with the wall element 26, the first end 36 of the positioning bracket 32 rests on this web 49 from above.

As is moreover apparent in FIG. 4, it is provided in an advantageous implementation that the wall unit 25 includes at least one positioning element. In particular, this positioning element is formed integrally with the wall unit 25. In particular, this positioning element is formed as a plug pin 50. This plug pin 50 laterally protrudes away from the web 49 in width direction. This plug pin 50 is formed to be plugged into a receptacle 51 (FIG. 2), which is formed on the inner side of the first wall 15 of the interior container 4. A pre-assembly position of the wall unit 25 at the interior container 4 is then advantageously allowed by this positioning element.

Additionally or instead, it can be provided that the positioning bracket 32 also includes a positioning element. In particular, this positioning element is formed as a plug pin 52 (FIG. 4) here too. In the shown embodiment, it is preferably formed in the horizontal second bracket leg 35. In particular, this positioning element is formed in the form of the exemplary plug pin 52 in the plate area 40 and extends upwards from a top side of the plate area 40 in height direction.

The positioning element formed as the plug pin 52 is also formed integrally with the positioning bracket 32.

Further, it is provided that the second bracket leg 35 includes a hole 53. It is formed for passing a separate fixing element, for example a screw.

In addition to the pre-assembly position for the wall unit 25 at the interior container 4 achievable by the positioning elements, in particular the plug pins 50 and/or 52, it is allowed by this hole 53 that the wall unit 25 can be correspondingly screwed to the interior container 4 for final assembly.

In this context, it is in particular additionally or instead possible that the engagement area 47 includes a hole 54, through which a fixing element separate therefrom such as in particular a screw can also be passed. Thereby, the wall unit 25 can additionally be screwed to the first wall 15. The wall unit 25 can be screwed to the second wall 19 via the hole 53.

In FIG. 4, seals 55 and 56 are moreover exemplarily shown, which then abut on the wall areas 22 and 23 in the assembled state of the wall unit 25 to allow a sealing housing 20. The seals 55 and 56 are a one-piece seal. The seal 55, 56 is elastic. In an embodiment the seal 55, 56 is of rubber. The seal 55, 56 is a bent and elongated seal 90. This means that the seal 55, 56 has the shape of a hose. The seal 55, 56 has a length axis B. The seal 55, 56 is not closed along the length axis B. This means that a first end 901 of the bent and elongated seal 90 and a second end 902 of the bent an elongated seal 90 are not in connection with each other. In the mounted state of the wall unit 25 at the interior container 4, the seals 55, 56 are compressed between the wall unit 25 of the ice maker 11 and the walls of the interior container 4.

The seal 55, 56 and therefore the bent an elongated seal 90 includes a hollow tube 91. The hollow tube 91 is hose-shaped. The hollow tube 91 has no gaps along the length axis B. In a plane perpendicular to the length axis B the hollow tube 91 has a circular cross section, or it may also has an oval cross section. In an embodiment, this is along the complete length of the hollow tube 91. Therefore in an embodiment the circular cross section is formed in a first seal section 90a, in a second seal section 90b (FIG. 24), in a third seal section 90c (FIG. 24), and in a fourth seal section 90d.

Figure 24:
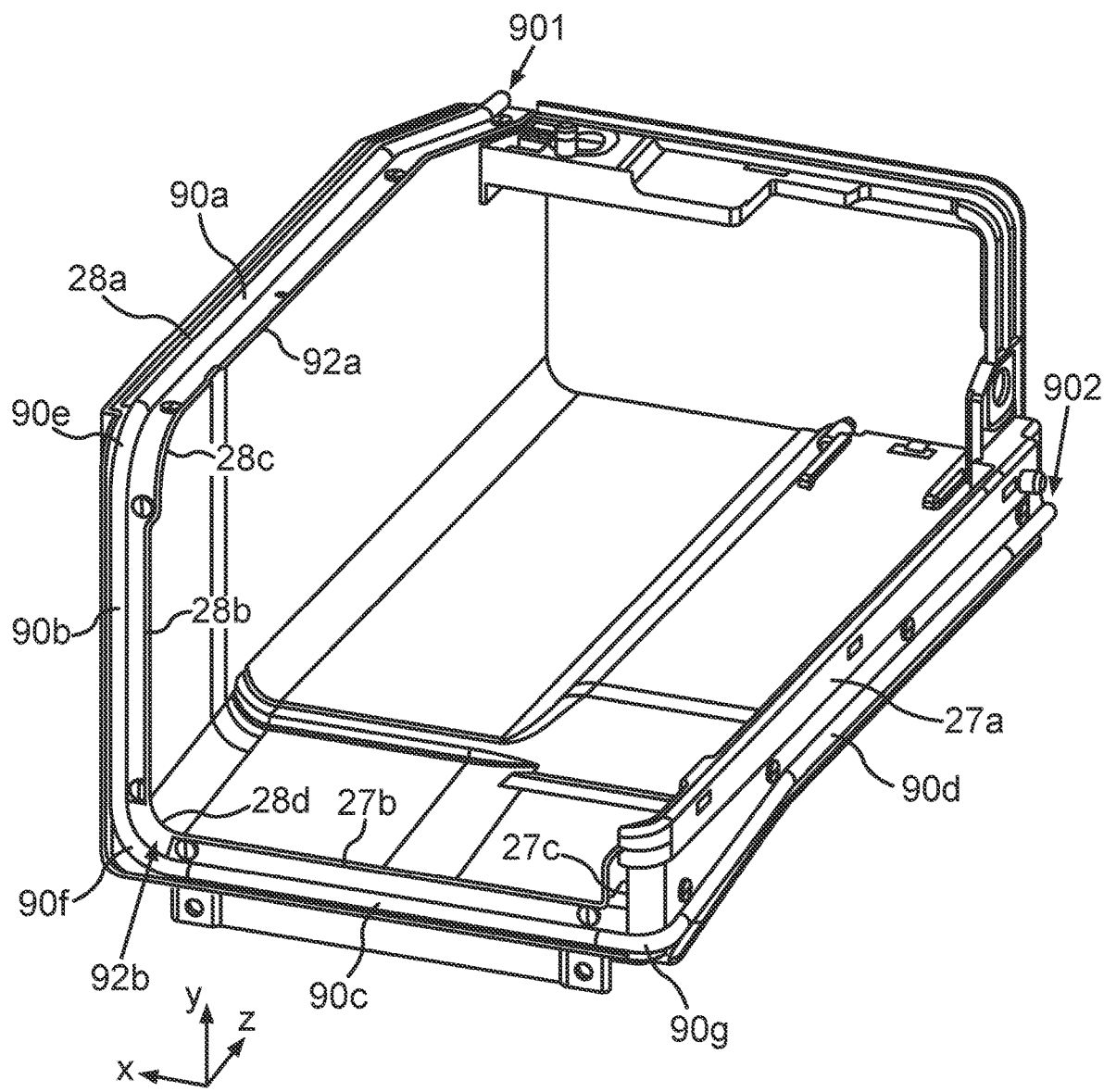
FIG. 24 is a further perspective view of an enlarged representation of a partial area of a housing of an ice maker of the household refrigeration apparatus with a disposed seal as shown in FIG. 4.

Further in an embodiment the circular or oval cross section is formed in a first seal section passage 90e. This is a curved part of the bent an elongated seal 90. The first seal section passage 90e connects the seal sections 90a and 90b. Further in an embodiment the circular or oval cross section is formed in a second seal section passage 90f (FIG. 24). This is a curved part of the bent an elongated seal 90. The second seal section passage 90f connects the seal sections 90b and 90c. Further in an embodiment the circular cross section is formed in a third seal section passage 90g. This is curved part of the bent an elongated seal 90. The third seal section passage 90g connects the seal sections 90c and 90d.

As it is shown in FIG. 4 and FIG. 24 the seal section passages 90e, 90f and 90g connect the corresponding section sections 90a, 90b, 90c, 90d in such a way that these seal sections 90a to 90g are pairwise disposed in an angle between 80° and 100°, especially 85° and 95°.

As it is shown the seal 55, 56 is disposed as a 3-dimensionally bent and elongated seal 90. This means that the seal sections 90a to 90d are not disposed linear to each other but in angled orientation. These angled orientations are in different spatial directions. As it could be seen in an embodiment the first seal section 90a is orientated in the depth direction z. Along the length axis B the following second seal section 90b is orientated in the height direction y. Along the length axis B the following third seal section 90c is orientated in width direction x. Along the length axis B the fourth seal section 90d is orientated in depth direction z.

The seal 55, 56 and therefore the bent an elongated seal 90 further includes a mounting strip 92. In an embodiment the mounting strip 92 is shaped bandlike. The mounting strip 92 and the hollow tube 91 are a one-piece part. The mounting strip 92 is a flat bar. The mounting strip 92 is without hollows. The mounting strip 92 is disposed on an outside of the hollow tube 91. The mounting strip 92 is radially overhanging from the outside of the hollow tube 91. The mounting strip 92 is disposed like a wing on the outside of the hollow tube 91.

As it could be seen in FIG. 4 the seal 55, 56 is disposed on an upper edge 28*a* of the second wall plate 28. Further the seal 55, 56 is disposed on a second rear edge 28*b* (FIG. 24) of the second wall plate 28. Further the seal 55, 56 is disposed on a side edge 27*a* of the first wall plate 27. Further the seal 55, 56 is disposed on a second rear edge 27*b* of the first wall plate 27.

The mounting strip 92 lies with the larger surface of its strip shape on the edges 27*a*, 27*b*, 28*a*, 28*b*.

At a first edge passage 28*c* the mounting strip 92 lies flat on the first edge passage 28*c*. Further a mounting strip edge 92*a* of the mounting strip 92 is curved in the same way as the curvature of the first edge passage 28*c*. Therefore at this first edge passage 28*a* no beading or folding of the mounting strip edge 92*a* occurs. The mounting strip edge 92*a* is the very small side of the mounting strip 92 in comparison to its two flat larger surfaces. The mounting strip edge 92*a* defines the thickness of the mounting strip 92.

At a second edge passage 28*d* (FIG. 24) the mounting strip edge 92*a* would be beaded or folded. Therefore at this position the mounting strip 92 includes a mounting strip gap 92*b* (FIG. 24). This is a cut out in the mounting strip 92. So no part of the mounting strip 92 is disposed at this second edge passage 28*d*. Therefore beading of the mounting strip edge 92*a* at this position is avoided. The mounting strip gap 92*b* is only in the area of the second edge passage 28*b*.

At a third edge passage 27*c* the mounting strip 92 has no gap. The mounting strip 92 lies flat on the third edge passage 27*c*. Further the mounting strip edge 92*a* of the mounting strip 92 is curved in the same way as the curvature of the third edge passage 27*c*. Therefore at this third edge passage 27*c* no beading or folding of the mounting strip edge 92*a* occurs.

As it is shown in FIG. 4 and FIG. 24 the seal 55, 56 is mounted with holders 94 (FIG. 4, 24, 25, 26, 27) on the wall plates 27 and 28. In an embodiment the holders 94 are spring clips. In an embodiment the mounting strip 92 includes holes 93 (FIG. 26, 27). The holders 93 extending through the holes 94. In an embodiment the holders 94 are snapped in snapping holes in the edges 27*a*, 27*b*, 28*a* and 28*b*.

The seal 55, 56 is extending in all three spatial directions with its seal sections 90*a*, 90*b*, 90*c* and 90*d* when disposed on the housing 20. This means that the length axis B is orientated in these directions in these seal sections 90*a*, 90*b*, 90*c*, 90*d*.

With the seal 55, 56 disposed on the housing 20 sealing the housing 20 to the interior container 4 is achieved.

In an embodiment the bent and elongated seal 90 has the shape of an elongated leg. This means that seal 90 is shaped like a cord or string.

In an embodiment the seal 55, 56 is of silicon.

The seal 55, 56 provides the advantage that a sealing function is achieved along the complete axis of the seal and therefore along the complete length of the seal 55, 56 without any interruption. Therefore the sealing function is also achieved at the corners or curves of the bent and elongated seal 90. At the corners or curves and therefore at the bent sections of the bent an elongated seal 90 no reduction of the cross section of the seal 90 occurs. This is an advantage especially in comparison foam seal.

In an embodiment the holders 94 are disposed in equal distances along the length axis B. Therefore a sealing function is improved. Foam seals are glued to the walls. This is an advantage because this leads to thinner sections of the seal and leads to folds in the seal.

Further an advantage is a better and easier mounting of such a seal 55, 56. The seal 55, 56 includes the advantage that it absorbs no moisture.

In an embodiment the circular cross section of the hollow tube 91 at all length section of the hollow tube 91 is advantageous for a better sealing function at the edges of the walls.

Further, it is also allowed by the plug pins 50 and/or 52 that in addition to the simple adjustment of a pre-assembly position of the wall unit 25, centering of this wall unit 25 relative to the interior container 4 is also allowed. Non-destructively detachable positioning of the wall unit 25 at the interior container 4 is allowed by the plug pins 50 and 52. The pre-assembly position of the wall unit 25 at the interior container 4 is self-adherent. This means that an assembler does no longer retain himself the wall unit 25 when he produces the screw connections to produce the assembled final position of the wall unit 25.

Figure 5:
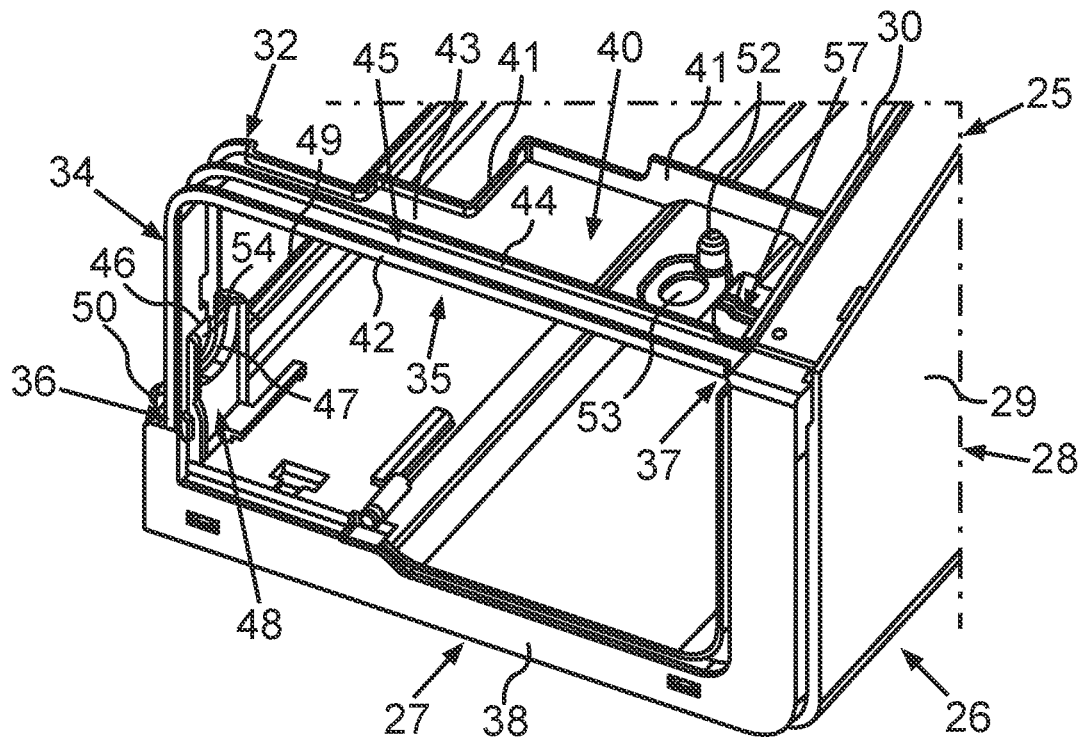
FIG. 5 is a partial representation of FIG. 4 in a perspective different from FIG. 4.

In FIG. 5, a partial area of the wall unit 25 according to the representation in FIG. 4 is shown, wherein a perspective different from FIG. 4 is here presented. Here, the coupling flap 48 is apparent. In particular, the engagement area 47 is also shown, which is locked in the aperture 46.

In FIG. 6, the representation according to FIG. 5 is shown, wherein a horizontal sectional representation of the positioning bracket 32 in the second bracket leg 35 is illustrated here. As is apparent in this context, the positioning bracket 32 includes an integrated, blind hole-like screw boss 57 in particular in the plate area 40. Thereby, the positioning bracket 32 can also be screwed to the wall plate 28.

Figure 7:
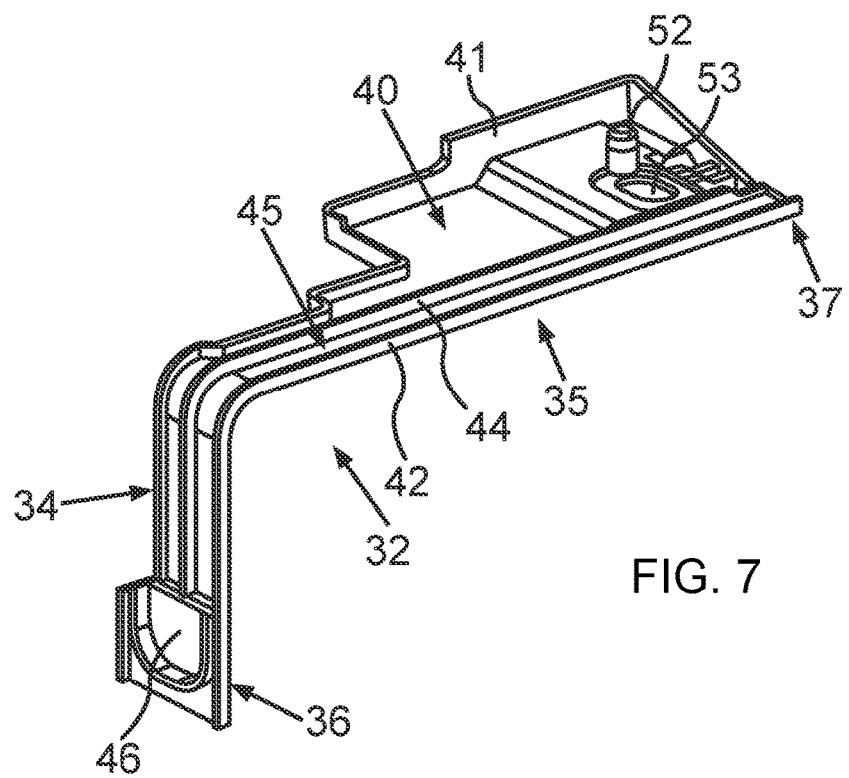
FIG. 7 is a perspective representation of an embodiment of a separate positioning bracket, which is a constituent of a wall unit of the housing of the ice maker.

In FIG. 7, the positioning bracket 32 is shown in a perspective representation.

Figure 8:
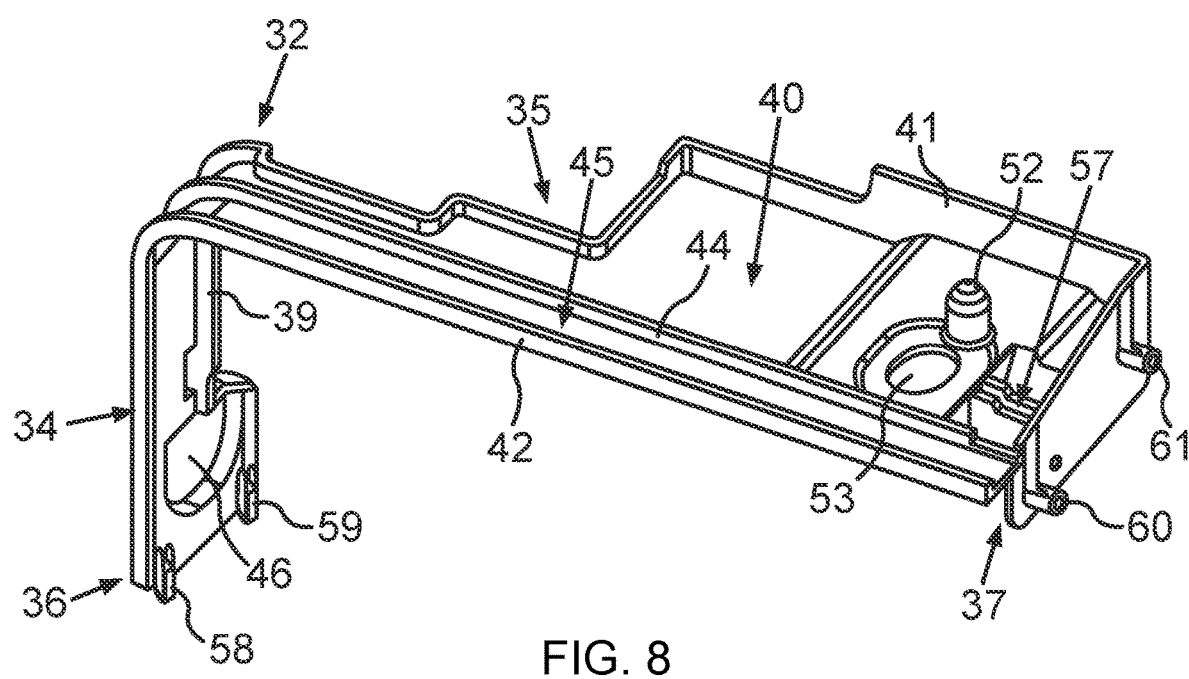
FIG. 8 is a view of the positioning bracket in a perspective different from FIG. 7.

In FIG. 8, the positioning bracket 32 is illustrated in a perspective different from FIG. 7. As is apparent here, the first bracket leg 34 includes retaining elements 58 and 59 protruding downwards at its end 36. These retaining elements 58 and 59 can be plug flaps or locking elements. Thereby, the positioning bracket 32 can additionally be non-destructively detachably attached to the wall element 26 in improved manner.

In a further implementation, it is provided that the positioning bracket 32 includes at least one plug element 60, here preferably two separate and spaced plug elements 60 and 61, at the second end 37. These plug elements 60, 61 are formed integrally with the positioning bracket 32. Upon assembly of the positioning bracket 32 to the wall element 26, these plug elements 60 and 61 are plugged into corresponding receptacles, one receptacle 62 of which is apparent in FIG. 6. This configuration too represents a fixing device, which is non-destructively detachable.

In FIG. 9, a partial area of the wall unit 25 is shown in a vertical sectional representation. Here, the sectional line is drawn through the plug pin 52.

As is apparent, the plate area 40 includes a depression 63. The hole 53 is formed in this depression 63. The hole 53 is in particular formed as an elongated hole. Preferably, the hole 54 is also formed as an elongated hole.

As is apparent in FIG. 9, a washer 64 is introduced into this depression 63, through which a screw 65 is passed. By the configuration of the hole 53 as an elongated hole, a certain backlash and thus a tolerance for positional adjustment is here allowed since the washer 64 is disposed in the hole 53 with backlash.

In FIG. 9, a further washer 66 and a screw 67 are moreover shown. The washer 66 is in particular formed corresponding to the washer 64 and correspondingly plunges into the hole 54. Her too, a certain positioning with backlash is thus allowed such that a tolerance compensation is allowed. The wall unit 25 can be screwed to a screw boss 71, which is integrally formed in the wall area 22, by the screw 67 such that a screw connection is formed at this place.

In FIG. 10, the partial section in FIG. 9 is shown in an enlarged representation, in which the screw 65 is illustrated. This backlash and thus this tolerance compensation are symbolized by the arrows in FIG. 10.

Figure 11:
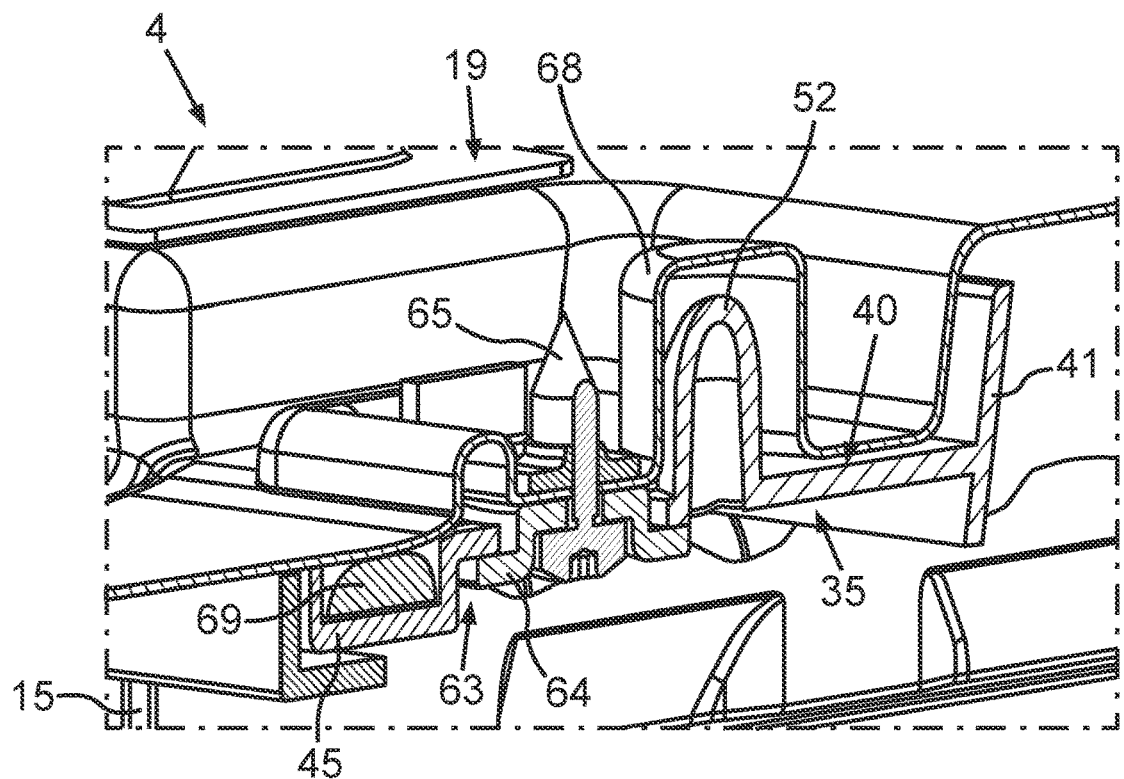
FIG. 11 is a perspective sectional representation of the household refrigeration apparatus in the area of the ice maker, in which the components according to FIG. 10 are also disposed.

In FIG. 11, the assembled state of the wall unit 25 to the interior container 4 in this area of the positioning bracket 32 according to FIG. 10 is shown in a perspective sectional representation. Here, it is apparent that the positioning element or the plug pin 52 plunges into a receptacle 68, which is formed integrally with the second wall 19, to allow the pre-assembly position and in particular also centering of the wall unit 25 around the interior container 4. The receptacle 68 is in particular formed as a blind hole. Moreover, a seal 69 is also shown in FIG. 11, which is disposed in the receiving groove 45.

Figure 12:
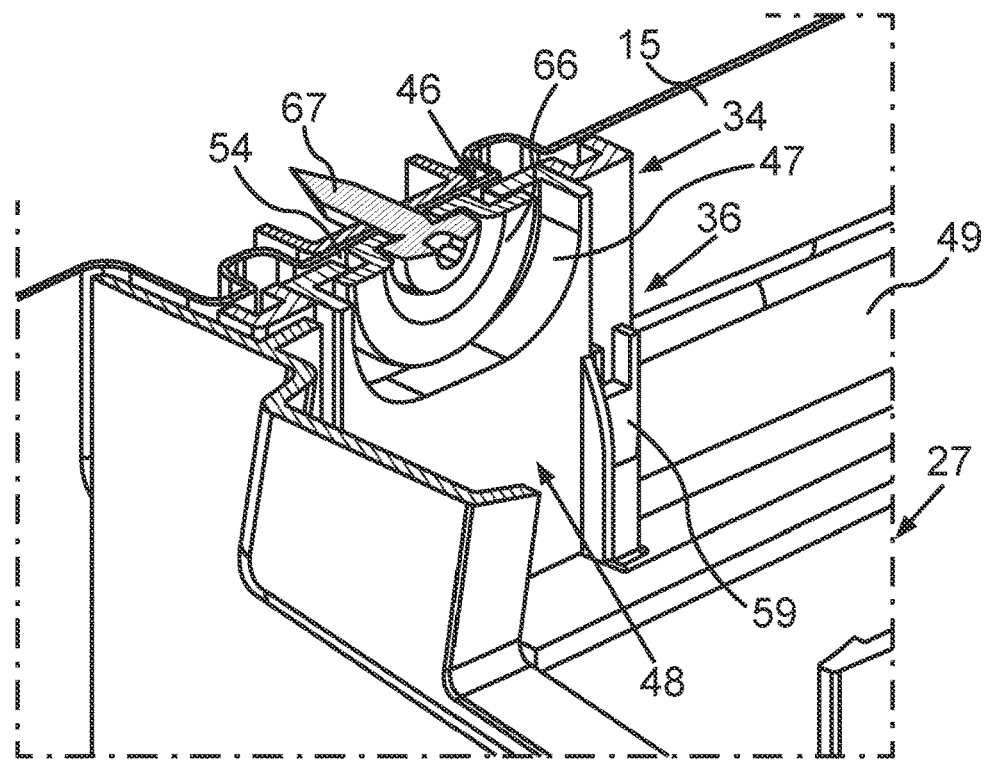
FIG. 12 is a perspective horizontal sectional representation of a partial area of the housing of the ice maker at a location different from FIG. 11.

In FIG. 12, it is shown in a perspective horizontal sectional representation, how the wall unit 25 is fixed to the first wall 15 in the area of the first end 36 of the positioning bracket 32.

Figure 13:
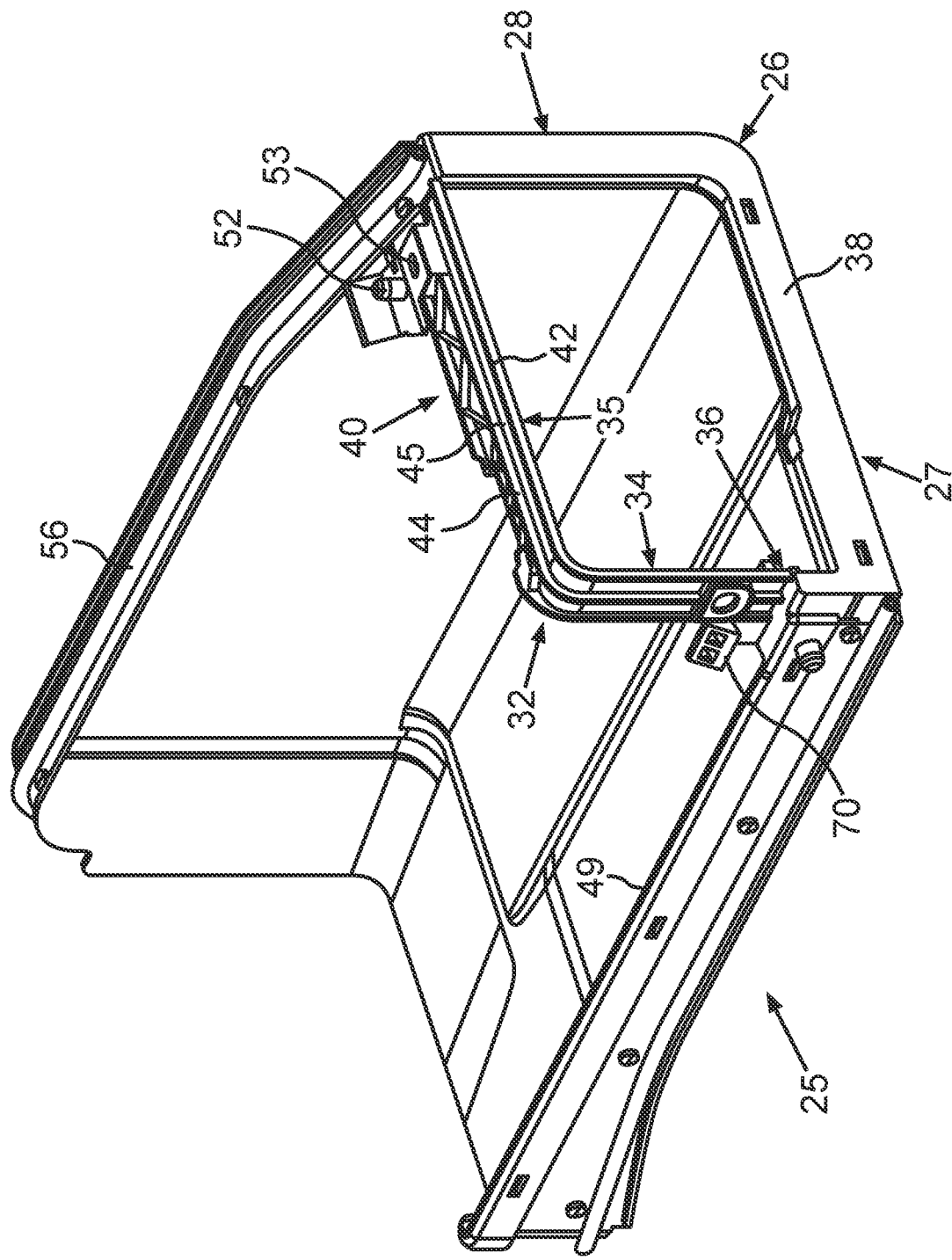
FIG. 13 is a perspective representation of an embodiment of a wall unit of a housing of an ice maker according to an embodiment which s different compared to FIG. 4.

In FIG. 13, a further embodiment for a wall unit 25 is shown in a perspective representation. In contrast to the representation according to FIG. 4, it is here provided that a locking element 70 is formed integrated and thus integrally on the wall plate 27 instead of the plug pin 50. In particular, the locking element 70 is disposed at the web 49. In particular, the locking element 70 is integrated in the inner wall element 30.

This locking element 70 can lock in a corresponding receptacle formed in the wall area 22. Moreover, in contrast to FIG. 4, the configuration of the positioning bracket 32, in particular of the second bracket leg 35, is slightly different from the configuration in FIG. 4. However, the basic and essential functions and elements are provided here too. In particular, this relates to the positioning element in the form of the plug pin 52 as well as the plug elements 60, 61, the hole 53 and preferably also the screw boss 57.

Figure 14:
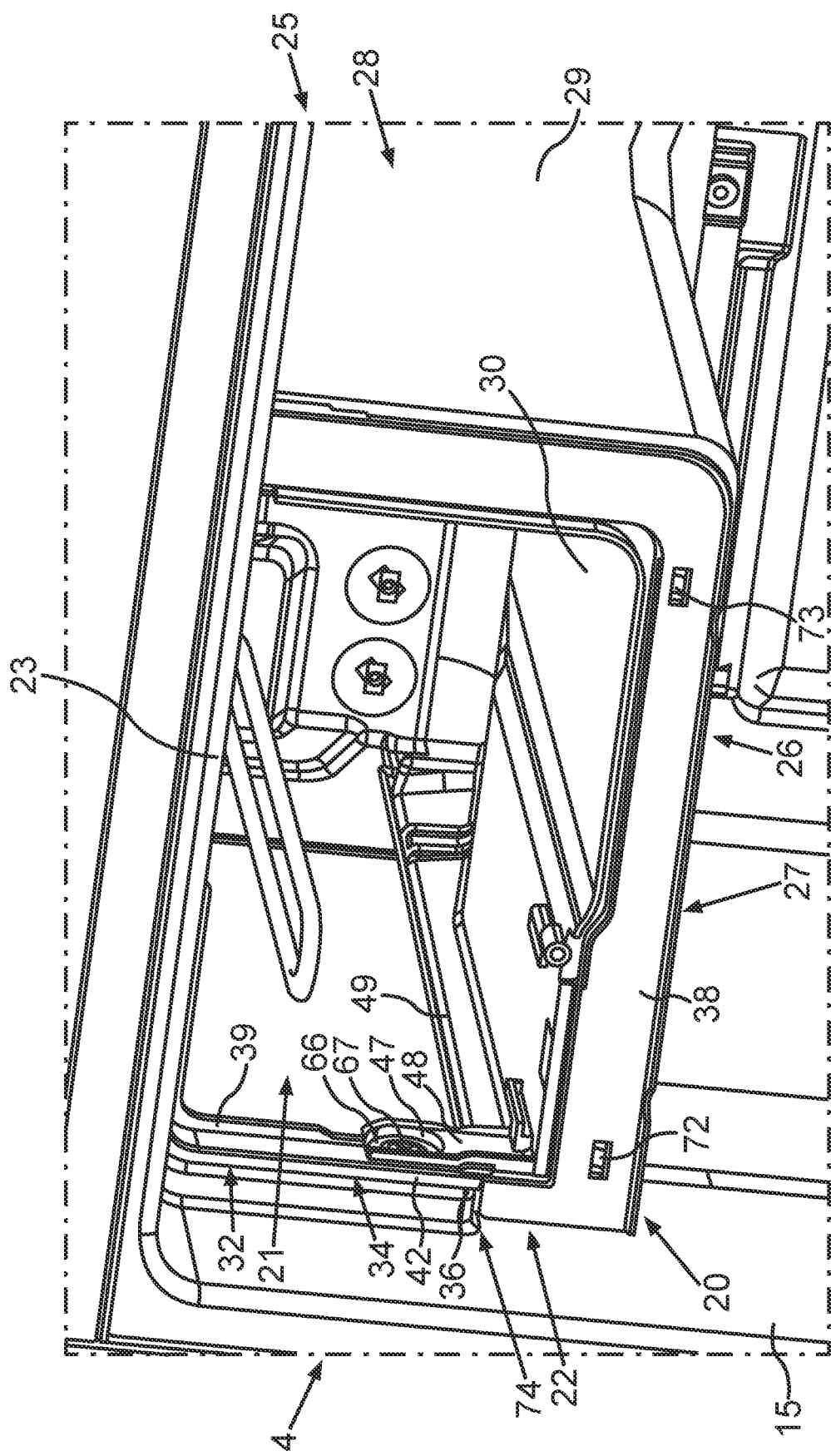
FIG. 14 is a perspective representation of a further embodiment of a housing of an ice maker of the household refrigeration apparatus.

In FIG. 14, the household refrigeration apparatus 1 is shown in the area of the ice maker 11 with the finally assembled housing 20 in an enlarged representation. The wall unit 25 is represented in its end position at the interior container 4 in this context.

As is also apparent in FIG. 14, the front edge 38 is non-destructively detachably connected, in particular locked, to the outer wall element 29. Thereto, two locking elements 72 and 73 are exemplarily apparent.

Further, it is provided that in an embodiment, which can be provided independently of the previous explanations with regard to the configuration of the wall unit 25, a wall step 74 is formed at the first wall 15 and there in the wall area 22, which bounds the receiving space 21 of the ice maker 11 and is associated with the housing 20.

In FIG. 15, the housing 20 is shown in a vertical sectional representation, wherein the wall step 74 is here also apparent.

The wall step 74 includes a protrusion 75. The protrusion 75 protrudes into the receiving space 21 of the ice maker 11 viewed in width direction of the household refrigeration apparatus 1. This protrusion 75 is formed as a condensation water drip bar 76.

A recess 77 is formed below the protrusion 75 in height direction. The wall element 26 plunges into this recess 77 viewed in width direction. In particular, this plunging is such that the web 49 is completely disposed in this recess 77. In particular, the protrusion 75 further protrudes into the receiving space 21 than the groove 49 is wide in this width direction. Thereby, the dripping of condensation water from the condensation water drip bar 76 is allowed such that water cannot get laterally past the groove 49 and thus into the recess 77. The condensation water drips from the condensation water drip bar 76 directly onto that area of the inner wall element 30, which inwardly adjoins to the web 49.

In FIG. 16, an enlarged representation of the view in FIG. 15 is shown, wherein that section in the area of the protrusion 75 and the recess 77 is shown here. Preferably, it is provided that an angle α, which is measured between a protrusion wall 79 of the protrusion 75 and the downward adjoining wall section 78 of the first wall 15 or the wall area 22, is less than or equal to 110°, in particular less than or equal to 90°.

Figure 17:
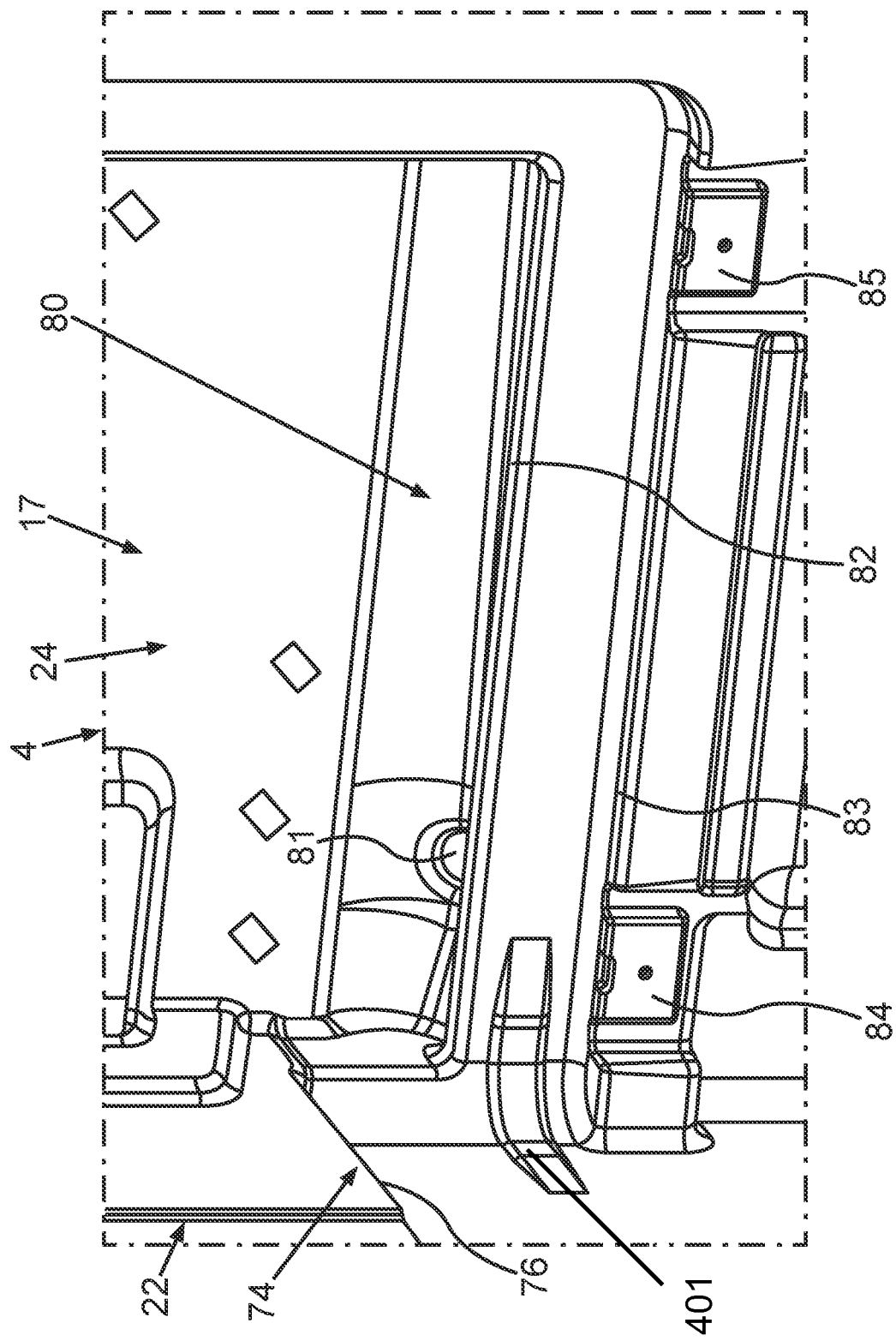
FIG. 17 is a representation of a partial area of a rear wall of the interior container with a drain gutter integrated therein for drainage of condensation water from the housing of the ice maker.

In FIG. 17, a partial section of the interior container 4 with view to the rear wall 17 is shown. Here, a viewing direction into the receiving space 6 is illustrated. In the wall area 24 of the rear wall 17, a drain gutter 80 is shown formed integrally therewith. Condensation water, which occurs in the ice maker 11, can in particular be conducted to this drain gutter 80 via the first wall plate 27. Thereto, the inner wall element 30 of the wall element 26 is preferably obliquely rearward inclined in particular in the area of the first wall plate 27. In this context, condensation water, which drips to the top side of the inner wall element 30 via the condensation water drip bar 76, can in particular be conducted to the rear in defined and targeted manner and thus then gets into the drain gutter 80.

The drain gutter 80 includes a drain stub 81. A drain line 95, as it is shown in FIGS. 21 and 22, can be connected to the drain stub 81.

The drain gutter 80 includes a front gutter edge 82 viewed in depth direction. This front gutter edge 82 can also serve as a rest for a web of the first wall plate 27.

In addition or instead, it can be provided that a pedestal base 83 formed spaced from and independently of the front gutter edge 82 is integrally formed in the interior container 4. This pedestal base 83 can serve as a rest for the first horizontal wall plate 27. As it is moreover apparent in FIG. 17, the rear wall 17 includes two screw domes 84 and 85 in the embodiment. The screw domes 84 and 85 are formed integrally with the rear wall 17. They are preferably formed in the area of the pedestal base 83. The wall element 26 can be screwed to the rear wall 19 by these screw domes 84 and 85.

In FIG. 17, the interior container 4 has a protrusion 401 that is integrally formed with the interior container 4 and protrudes into the receiving space 6. The protrusion 401 has an elongated shape and extends horizontally along the corner portion between the side wall 15 and the rear wall 6 of the interior container 4. In the mounted state of the wall unit 25 at the interior container 4, the protrusion 401 compresses the seal 90 together and provides an appropriate sealing of the ice maker 11 at the edge passage 27c of the wall unit 25.

Figure 18:
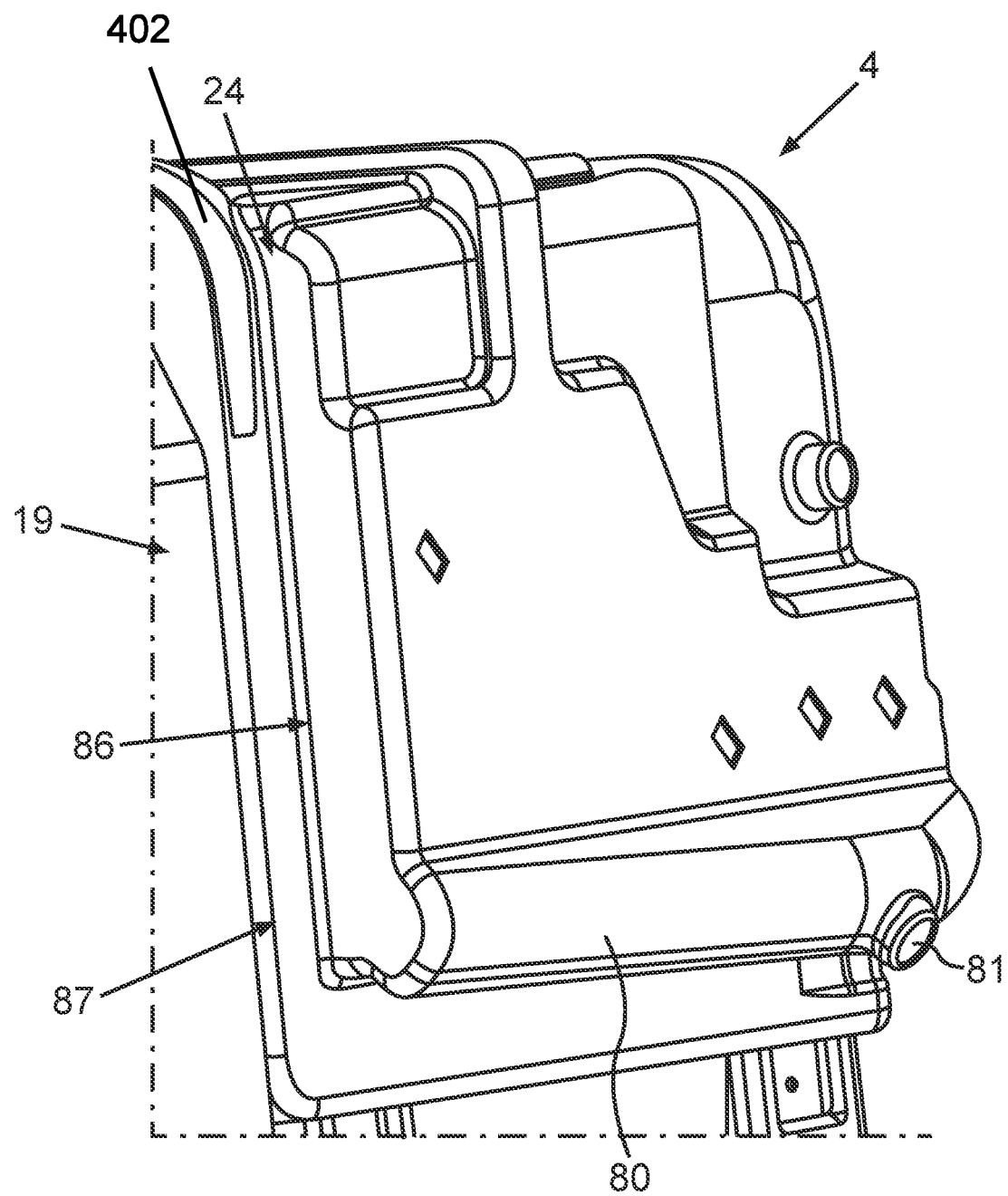
FIG. 18 is a perspective representation of an upper area of the interior container, wherein a rear wall with the integrated drain gutter is herein represented with rear view.

In FIG. 18, the interior container 4 is shown in its upper area, wherein a view to the rear wall 17 from behind is provided here. Thus, a view is directed from the foam side to the rear wall 17, which means that it is looked from the clearance 5 towards the rear wall 17.

Here, it is apparent that a pedestal 86 is integrally formed at the rear wall 17 in an advantageous implementation. This pedestal 86 is formed offset rearward with respect to a base plate 87 of the rear wall 17 viewed in depth direction. Thus, the pedestal 86 is formed backpack-like at the base plate 87. As is apparent in FIG. 18, the drain gutter 80 is formed at the lower end of the pedestal 86, in particular formed completely within the pedestal 86. The drain gutter 80 is therefore disposed offset rearward with respect to the base plate 87 viewed in depth direction. In particular, the drain gutter 80 is thus virtually rearward offset from the volume, which is bounded by the base plate 87, and thus rearward offset towards the clearance 5. Thus, the drain gutter 80 is displaced into the area, in which the insulating foam is disposed.

Moreover, it is also apparent in FIG. 18 that the drain gutter 80 bulges out rearward with respect to the pedestal 86, which is trough-like formed, and thus forms a bead-like protrusion towards the bottom and the rear. Preferably, the drain gutter 80 extends across the entire width of the pedestal 86.

In FIG. 18, the interior container 4 has a further protrusion 402 that is integrally formed with the interior container 4 and protrudes into the receiving space 6. The further protrusion 402 has an elongated shape and extends vertically along the corner portion between the rear wall 6 and the ceiling wall 19 of the interior container 4. In the mounted state of the wall unit 25 at the interior container 4, the further protrusion 402 compresses the seal 90 together and provides an appropriate sealing of the ice maker 11 at the edge passage 28c of the wall unit 25.

In FIG. 19, the interior container 4 is shown in a transparent side view in an implementation. The above mentioned positional arrangements of the drain gutter 80 to the base plate 87 are apparent. Moreover, it is also apparent that the protrusion 75 extends uninterrupted from the front end of the housing 20 up to the drain gutter 80.

In FIG. 20, a partial area of the interior container 4 is shown in an enlarged representation, as it is illustrated in FIG. 19. Here, that partial area with the pedestal 86 and the drain gutter 80 is in particular again clarified.

In FIG. 21, the interior container 4 is shown in the upper area in a sectional representation, wherein the wall unit 25 is here also shown in the assembled final state and is apparent in a vertical sectional representation.

In FIG. 22, the rear area with the drain gutter 80 is shown in an enlarged representation. As is apparent, the first wall plate 27 includes a web 88 protruding rearward viewed in depth direction. This rearward protruding protrusion in the form of the web 88 extends up into the drain gutter 80. In particular, this web 88 is disposed upward offset and contactless to the front gutter edge 82, as it is shown in FIG. 22. The web 88 extends in depth direction for example as far as it completely covers the front gutter edge 82.

Thereby, it is also allowed that the drain of the condensation water from the first wall plate 27 is securely effected into the drain gutter 80 on the one hand. On the other hand and independently thereof, it is thereby then also allowed that the first wall plate 27 is positionally securely and mechanically stably retained and virtually rests on this front gutter edge 82. Thereby, it is in particular also allowed that a pre-assembly position of the wall unit 25 is now also securely achieved at this location in addition to the previously mentioned examples with the positioning elements or instead thereof.

In addition or instead, it can be provided that the first wall plate 27 rests on the pedestal base 83, as it is shown in FIG. 22. The screw joint or a screw connection, in particular of the first wall plate 27 to the screw boss 84, is also shown, wherein a screw 89 is illustrated here. In FIG. 22, a state is shown, in which the web 88 protrudes into the drain gutter 80 viewed in depth direction, but is disposed spaced from the front gutter edge 82 at this location.

Figure 23:
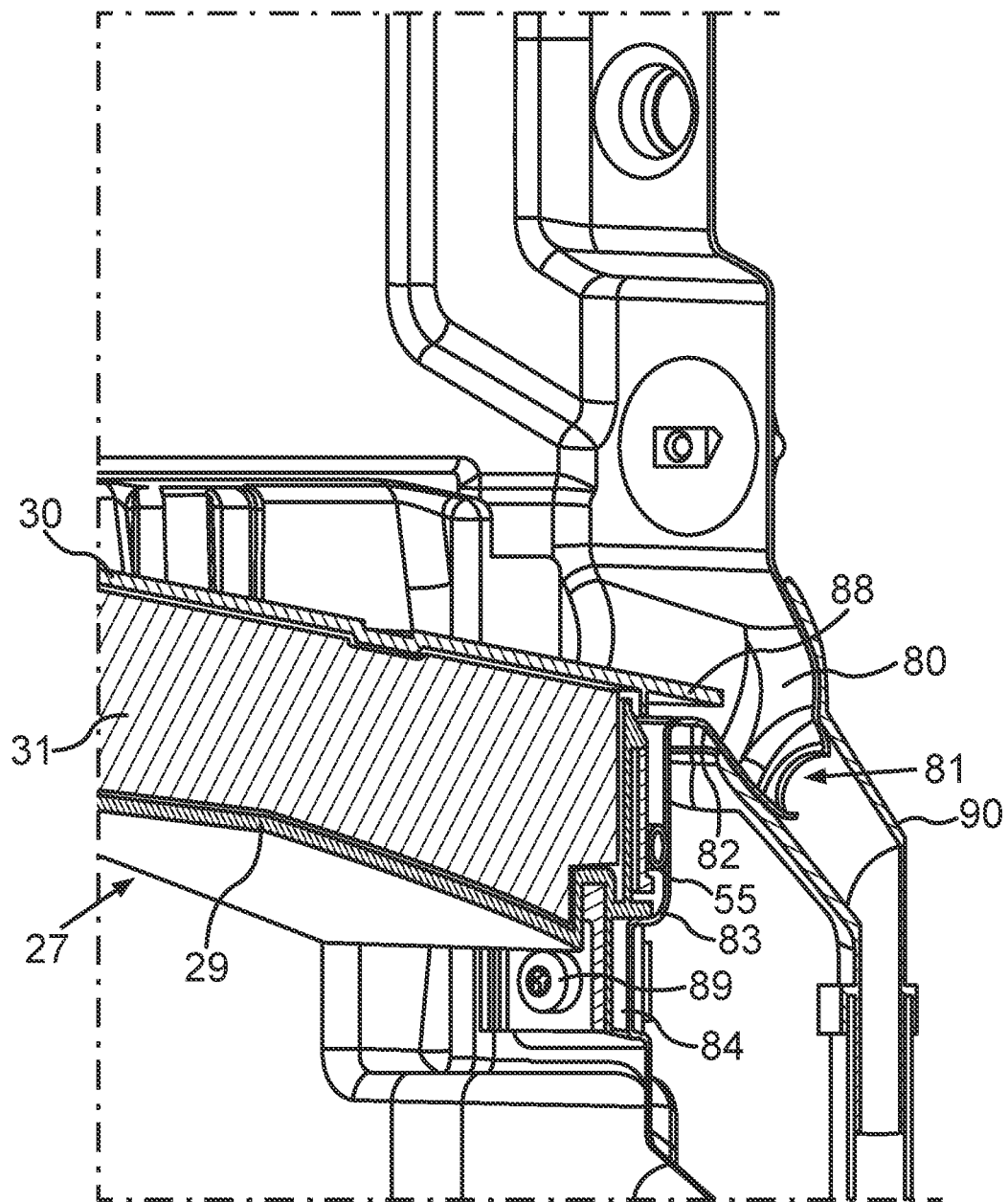
FIG. 23 is a vertical sectional representation corresponding to FIG. 22 at a location different from FIG. 22.

In FIG. 23, in a perspective sectional representation, which is slightly offset to the right in width direction with respect to the representation in FIG. 22, a corresponding area is shown as it is represented in FIG. 22.

Further, in the embodiment, but which is not to be conclusively understood, four screw connections are provided, by which the wall unit 25 is fixed to the interior container 4. This relates to the screw connection with the screw 67, the screw connection with the screw 65 and the screw connections with screws 89 at the screw domes 84 and 85. More or less screw connections can also be provided.

In a method for assembling the housing 20 of the ice maker 11, the interior container 4 is produced and provided integrally with the first wall 15 and with the second wall 19 disposed angled thereto. Furthermore, a wall unit 25 separate from the interior container 4 is provided, wherein the wall unit 25 includes at least one positioning element, which is formed integrally with the wall unit 25. The positioning elements are produced as plug pins 50 and/or 52 and/or as a locking element 70. This wall unit 25 is introduced into the receiving space 6 of the interior container 4. In particular, the web 88 is first placed on the pedestal base 83. At the same time or subsequently, the plug pin 50 is introduced into the receptacle 51 and/or the plug pin 52 is introduced into the receptacle 68 in the embodiment. Since the plug pins 50 and 52 are oriented in different spatial directions, namely in width direction and in height direction, a pre-assembly position in height direction and in width direction, in particular in the front area 33, can be autonomously retained by this implementation. The same is achieved with the locking element 70 if it is formed instead of the plug pin 50. The plug pin 52 can for example also be replaced with a locking element. By the rest of the web 88 on the pedestal base 83 in the rear area of the housing 20, the pre-assembly position is securely and autonomously retained there too.

As already explained above in FIG. 24 a perspective view of an enlarged representation of a partial area of the housing 20 of the ice maker of the household refrigeration apparatus 1 with a disposed seal 55, 56 is shown. The perspective view is different to FIG. 4 and FIG. 13.

Figure 25:
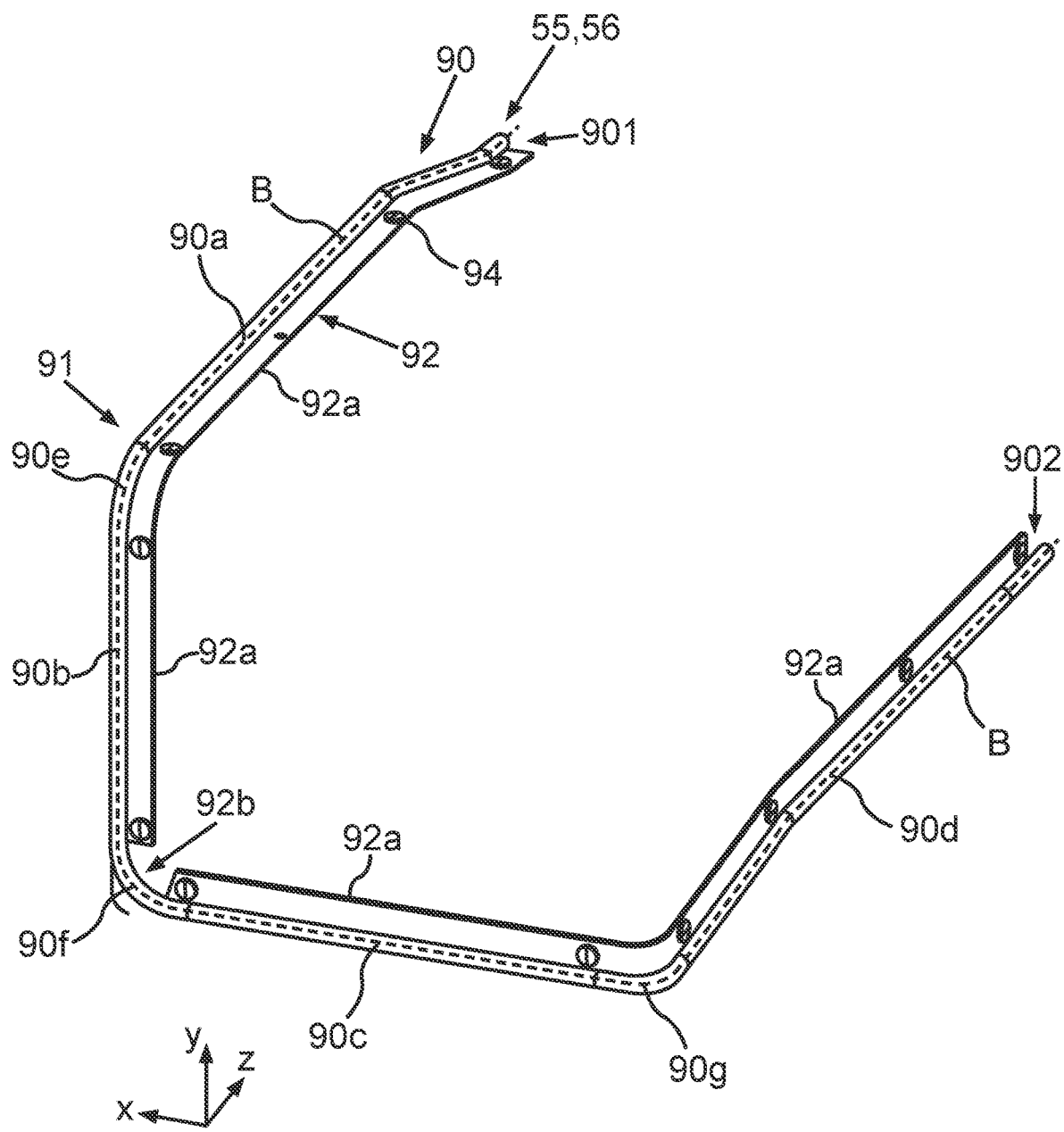
FIG. 25 is a view of the 3-dimensionally bent and elongated seal as disposed in FIG. 24.

In FIG. 25 the 3-dimensionally bent seal 55, 56 from FIG. 24 is shown. Further the holders 94 are shown.

In FIG. 26 the seal 55, 56 shown in FIG. 25 is shown in a state not bent. Therefore the seal 55, 56 is shown in a complete linear state. The mounting strip gap 92b is shown.

Further in FIG. 27 an enlarged end 901 of the seal 55, 56 in FIG. 26 is shown, especially with a holder 94.

In this pre-assembly position, the subsequent screwing of the screws, which are provided for producing the screw connections, and by which the final position of the wall unit 25 at the interior container 4 is produced, can be effected without retaining the wall unit 25 by an assembler. The assembler then has both hands free to produce the screw connections.

Generally and independently of the explained embodiments, individual advantageous developments of an ice maker, in particular the housing of the ice maker, of the household refrigeration apparatus can be provided.

In an embodiment, the positioning bracket has an L-shape. Preferably, the positioning bracket is integrally formed. Preferably, the housing has a depth direction, and the wall element includes a front area viewed in depth direction, wherein the positioning bracket is disposed on the front area.

In an embodiment, the front area includes a front edge, and a circumferentially closed frame is formed by the front edge and the positioning bracket.

In an embodiment, the positioning bracket includes a bracket leg and at least one stiffening rib is formed at the bracket leg.

In an embodiment, the stiffening rib is oriented in the direction of a longitudinal axis of the positioning bracket and is a bounding wall of a receiving groove for a seal.

In an embodiment, the positioning bracket includes a bracket leg, at the end of which at least one locking element is integrated formed.

In an embodiment, the household refrigeration apparatus includes an interior container, which bounds a first receiving space for food of the household refrigeration apparatus, and the positioning bracket includes at least one positioning element for non-destructively detachably pre-positioning the housing at the interior container.

In an embodiment, the positioning bracket includes a bracket leg, at the end of which at least one plug element is integrated formed.

In an embodiment, the positioning bracket includes a bracket leg, which includes a plate area, wherein a depression for receiving a washer is formed in the plate area, and a hole for passing a fixing element is formed in the depression.

In an embodiment, the positioning bracket includes a bracket leg, which includes an aperture, and the wall element includes a coupling flap for coupling to the positioning bracket, wherein the coupling flap includes an engagement area, which engages with the aperture.

In an embodiment, the engagement area includes a hole for passing a fixing element.

In an embodiment, the positioning bracket includes a bracket leg, wherein the bracket leg includes an integrated, blind hole-like screw boss.

In an embodiment, the housing has a depth direction, and the wall unit includes a front area viewed in depth direction, wherein the plug pin or the locking element is disposed on the front area.

In an embodiment, the wall unit includes a wall element, which has an L-shape in cross-section, wherein the wall element includes a first wall plate and a second wall plate, which together form the L-shape, wherein a plug pin or a locking element is disposed at an edge of the first wall plate.

In an embodiment, the wall unit includes a non-rectilinear positioning bracket, which includes a horizontal bracket leg, wherein a plug pin is disposed on a top side of the horizontal bracket leg.

In an embodiment, the positioning bracket has an L-shape, which is formed by the horizontal bracket leg and a vertical bracket leg.

In an embodiment, the positioning bracket is integrally formed and is a component separate from the wall element, wherein the positioning bracket is non-destructively detachably connected to the wall element.

In an embodiment, the wall area of the first wall or the wall area of the second wall includes a receptacle, to which the plug pin or the locking element can be non-destructively detachably attached for forming a pre-assembly position of the wall unit at the interior container.

In an embodiment, the wall unit is disposed at the interior container with at least one screw connection in addition to the at least one plug pin or the at least one locking element.

In an embodiment, the interior container includes a rear wall, and the rear wall includes a step, which is a rest, on which the wall unit rests.

In an embodiment, the wall unit includes a wall element, which is a component separate from the interior container, wherein the wall element has an L-shape in cross-section, and the wall element includes a first wall plate and a second wall plate, which together form the L-shape, wherein the household refrigeration apparatus has a depth direction, and wherein the first wall plate includes a rear web protruding rearward in depth direction and the web rests on the step.

In an embodiment, the household refrigeration apparatus has a depth direction and the interior container includes a rear wall with a base plate, in which a drain gutter for condensation water, which forms in the ice maker, is integrated formed, wherein the drain gutter is disposed offset rearward compared to the base plate of the rear wall viewed in depth direction.

In an embodiment, the drain gutter includes a front gutter edge and the web is disposed above the front gutter edge in contactless manner and the web extends across the entire thickness, which is measured in depth direction, of the front groove gutter edge viewed in depth direction.

In an embodiment, the household refrigeration apparatus has a depth direction, and the interior container includes a rear wall with a base plate, wherein a drain gutter for condensation water, which forms in the ice maker, is formed integrated in the rear wall. The rear wall includes a pedestal, which is formed integrally with the base plate and which is disposed offset rearward compared to the base plate in depth direction, wherein the drain gutter is formed in the pedestal, wherein the pedestal includes a lower pedestal base spaced from the drain gutter, which forms the step, wherein the web rests on the pedestal base.

In an embodiment, the protrusion includes a protrusion wall, wherein an angle between the protrusion wall and a further wall section of the first wall downwards adjoining to the protrusion is less than or equal to 110°, in particular less than or equal to 90°.

In an embodiment, the household refrigeration apparatus has a depth direction, wherein the protrusion extends across the entire length of the housing of the ice maker in this depth direction.

In an embodiment, the housing of the ice maker includes a wall element, which is a component separate from the interior container, wherein the wall element has an L-shape in cross-section, and the wall element includes a first wall plate and a second wall plate, which together form the L-shape, wherein the household refrigeration apparatus has a height direction, and a recess is formed below the protrusion in height direction, into which the wall element extends.

In an embodiment, an inner wall of the first wall plate is rearward inclined at least in certain areas viewed in depth direction.

In an embodiment, the household refrigeration apparatus has a depth direction and the interior container includes a rear wall with a base plate, in which a drain gutter for condensation water, which forms in the ice maker, is integrated formed, wherein the drain gutter is disposed offset rearward compared to the base plate viewed in depth direction.

In an embodiment, the rear wall includes a pedestal, which is formed integrally with the base plate and which is disposed offset rearward compared to the base plate in depth direction, wherein the drain gutter is formed in the pedestal and bulges out rearward with respect to a rear end wall of the pedestal.

In an embodiment, the pedestal is a wall area of the housing of the ice maker, by which a receiving space of the ice maker is bounded.

In an embodiment, the drain gutter includes an integrated drain stub.

In an embodiment, the housing of the ice maker includes a wall element, which is a component separate from the interior container, wherein the wall element has an L-shape in cross-section and the wall element includes a first wall plate and a second wall plate, which together form the L-shape, wherein the household refrigeration apparatus has a depth direction, and wherein the first wall plate includes a rear web, wherein the web protrudes into the drain gutter viewed in depth direction.

In an embodiment, the drain gutter includes a front gutter edge and the web is disposed contactless to the front gutter edge above the front gutter edge. Viewed in depth direction, the web extends across the entire thickness, which is measured in depth direction, of the front gutter edge.

The following is a summary list of reference numerals and the corresponding structure used in the above description of the invention:

1 Household refrigeration apparatus
2 housing
3 exterior housing
4 interior container
5 clearance
6 receiving space
7 door
8 door
9 receiving space
10 door
11 ice maker
12 dispenser unit
13 output unit
14 front side
15 side wall
16 side wall
17 rear wall
18 bottom wall
19 ceiling wall
20 housing
21 receiving space
22 wall area
23 wall area
24 wall area
25 wall unit
26 wall element
27 wall plate
27a side edge
27b first rear edge
27c third edge passage
28 wall plate
28a upper edge
28b second rear edge
28c first edge passage
28d second edge passage
29 outer wall element
30 inner wall element
31 thermally insulating material
32 positioning bracket
33 front area
34 bracket leg
35 bracket leg
36 first end
37 second end
38 front edge
39 stiffening rib
40 plate area
41 bounding wall
42 stiffening rib
43 outer side
44 stiffening rib
45 receiving groove
46 aperture
47 engagement area
48 coupling flap
49 web
50 plug pin
51 receptacle
52 positioning element
53 hole
54 hole
55 seal
56 seal
57 screw boss
58 retaining element
59 retaining element
60 plug element
61 plug element
62 receptacle
63 depression
64 washer
65 screw
66 washer
67 screw
68 receptacle
69 seal
70 locking element
71 screw boss
72 locking element
73 locking element
74 wall step
75 protrusion
76 condensation water drip bar
77 recess
78 wall section
79 protrusion wall
80 drain gutter
81 drain stub
82 gutter edge
83 pedestal base
84 screw boss
85 screw boss
86 pedestal
87 base plate
88 web
89 screw
90 bent and elongated seal
90a first seal section
90b second seal section
90c third seal section
90d fourth seal section
90e first seal section passage
90f second seal section passage
90g third seal section passage
91 hollow tube
92 mounting strip
92a mounting strip edge
92b mounting strip gap
93 hole
94 holder
95 drain line
901 end
902 end
401 protrusion
402 protrusion A angle
B length axis

The invention claimed is:
1. A household refrigeration apparatus, comprising:
an interior container having a first wall, a second wall and a rear wall being angled relative to each other, said interior container bounding a first receiving space of the household refrigeration apparatus for food;
an ice maker having a housing with two walls respectively formed by a wall area of said first wall of said interior container and a wall area of said second wall of said interior container, said housing bounding a receiving space of said ice maker;
said housing having a wall unit with a wall element being a component separate from said interior container and having an L-shape in cross-section, said wall element having a first wall plate and a second wall plate together forming said L-shape;
said wall unit including an L-shaped positioning bracket consisting of only a vertical leg disposed only at a front of said housing of said ice maker and a horizontal leg disposed only at the front of said housing of said icemaker, said positioning bracket being nondestructively detachably connected to said wall element, said positioning bracket located between said wall element and said interior container;
an elongate seal having a hollow portion disposed on an edge of said wall element, said elongate seal sealing said wall element to said interior container.

2. The household refrigeration apparatus according to claim 1, wherein said elongate seal is a tube having an endless circular cross section.

3. The household refrigeration apparatus according to claim 1, wherein said elongate seal has a length axis and said hollow portion having no gap along said length axis.

4. The household refrigeration apparatus according to claim 1, wherein said elongate seal has a length axis, a plane perpendicular to said length axis, and said hollow portion including a circular or oval cross section in said plane perpendicular to said length axis.

5. The household refrigeration apparatus according to claim 1, wherein said elongate seal is three-dimensionally bent and extends on said housing in three spatial directions.

6. The household refrigeration apparatus according to claim 1, wherein said elongate seal is elastic.

7. The household refrigeration apparatus according to claim 1, wherein said hollow portion of said elongate seal is compressed between said interior container and said wall element in a mounted state of said wall unit.

8. The household refrigeration apparatus according to claim 1, wherein said elongate seal is a one-piece seal.

9. The household refrigeration apparatus according to claim 8, wherein said elongate seal includes a mounting strip.

10. The household refrigeration apparatus according to claim 9, wherein said mounting strip is formed without hollows.

11. The household refrigeration apparatus according to claim 9, wherein said mounting strip includes a mounting strip gap.

12. The household refrigeration apparatus according to claim 9, wherein said mounting strip is disposed on an outside of said hollow portion.

13. The household refrigeration apparatus according to claim 9, wherein said mounting strip overhangs from said outside of said hollow portion.

14. The household refrigeration apparatus according to claim 9, wherein said mounting strip includes holes and said ice maker includes separate holders disposed in said holes for fixing said elongate seal at said housing.

15. The household refrigeration apparatus according to claim 14, wherein said holders are spring clips.

16. The household refrigeration apparatus according to claim 1, wherein said wall element with an L-shape in cross-section is only one wall element with an L-shape in cross-section of said wall unit.

17. The ice maker according to claim 1, wherein said first wall plate includes a side edge and a first rear edge, and said elongate seal is disposed on said side edge and said first rear edge and extends along an edge passage between said side edge and said first rear edge.

18. The household refrigeration apparatus according to claim 17, wherein said second wall plate includes an upper edge and a second rear edge, and said elongate seal is disposed on said upper edge and said second rear edge and extends along a first edge passage between said upper edge and said second rear edge.

19. The household refrigeration apparatus according to claim 1, wherein said first wall plate includes a first rear edge, a second wall element includes a second rear edge, and said elongate seal is disposed on said first rear edge and said second rear edge and extends along a second edge passage between said first rear edge and said second rear edge.

20. The household refrigeration apparatus according to claim 19, wherein said first wall plate and said second wall plate are formed as a one-piece plate.

21. A household refrigeration apparatus, comprising:
an interior container having a first wall, a second wall and a rear wall being angled relative to each other, said interior container bounding a first receiving space of the household refrigeration apparatus for food;
an ice maker having a housing formed by a wall area of said first wall of said interior container, a wall area of said second wall of said interior container and a wall area of said rear wall of said interior container in certain areas, said housing bounding a receiving space of said ice maker;
said housing having a wall unit with a wall element being a component separate from said interior container, said wall element having an L-shape in cross-section, said wall element having a first wall plate and a second wall plate together forming said L-shape;
said wall unit including an L-shaped positioning bracket consisting of only a vertical leg disposed only at a front of said housing of said ice maker and a horizontal leg disposed only at the front of said housing of said icemaker, said positioning bracket being nondestructively detachably connected to said wall element, said positioning bracket located between said wall element and said interior container;
an elongate seal being a tube having an endless circular cross section extending along an edge of said wall element and sealing said wall element to said interior container, said elongate seal having a hollow portion being compressed between said interior container and said wall element in a mounted state of said wall unit.

22. The household refrigeration apparatus according to claim 21, wherein said interior container has a protrusion protruding into said receiving space.

23. The household refrigeration apparatus according to claim 22, wherein said protrusion is integrally formed with said interior container.

24. The household refrigeration apparatus according to claim 22, wherein said protrusion has an elongate shape and extends horizontally along a corner portion between said first side wall and said rear wall.

25. The household refrigeration apparatus according to claim 24, wherein said elongate seal is compressed between said protrusion and an edge passage of said wall element.

26. The household refrigeration apparatus according to claim 22, wherein said protrusion has an elongate shape and extends vertically along a corner portion between said second side wall and said rear wall.

27. The household refrigeration apparatus according to claim 26, wherein said elongate seal is compressed between said protrusion and an edge passage of said wall element.

* * * * *